(12) United States Patent
Okutani et al.

(10) Patent No.: US 6,954,582 B2
(45) Date of Patent: Oct. 11, 2005

(54) DIGITAL VTR AND VIDEO RECORDING / REPRODUCING APPARATUS

(75) Inventors: Ayumu Okutani, Kashihara (JP); Yoshiki Hirose, Daito (JP); Akira Yamasaki, Daito (JP); Tetsuro Yabumoto, Kyotanabe (JP); Kazunori Miyata, Neyagawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 885 days.

(21) Appl. No.: 09/783,614

(22) Filed: Feb. 15, 2001

(65) Prior Publication Data

US 2001/0016109 A1 Aug. 23, 2001

(30) Foreign Application Priority Data

Feb. 18, 2000 (JP) ........................................ 2000-041189
Feb. 18, 2000 (JP) ........................................ 2000-041190
Feb. 28, 2000 (JP) ........................................ 2000-051302
Feb. 28, 2000 (JP) ........................................ 2000-051303

(51) Int. Cl.$^7$ ................................................. H04N 5/91
(52) U.S. Cl. ............................ 386/69; 386/68; 386/124
(58) Field of Search ........................... 386/27, 33, 40, 386/68, 69, 81, 82, 124, 111–112; 360/40, 48, 72.1, 72.2

(56) References Cited

U.S. PATENT DOCUMENTS

| 5,825,971 | A |   | 10/1998 | Inoue et al. |
| 5,960,150 | A |   | 9/1999 | Ueda et al. |
| 5,999,354 | A | * | 12/1999 | Shitara ........................ 360/53 |
| 6,134,061 | A | * | 10/2000 | Inoue et al. .................. 360/48 |

FOREIGN PATENT DOCUMENTS

| DE | 195 11 246 A | 10/1995 |
| JP | 2000-175151 | 6/2000 |
| JP | 2001-136488 | 5/2001 |
| WO | WO 98/16069 | 4/1998 |

* cited by examiner

*Primary Examiner*—James J. Groody
*Assistant Examiner*—Alicia M Duggins
(74) *Attorney, Agent, or Firm*—Arent Fox PLLC

(57) ABSTRACT

Disclosed is a digital VTR comprising means for recording a cue mark in a position, corresponding to a predetermined position in the middle of each recording block, on a control track of a magnetic tape at the time of recording, means for stopping, at the time point where actual data in the recording block are stored in predetermined amounts in a memory, the acceptance of the data in the memory and accelerating a capstan motor at the time of fast-forward play, and means for decelerating the capstan motor when the cue mark is detected.

4 Claims, 20 Drawing Sheets

| FRONT DUMMY DATA PORTION (32 TRACKS, 16 CTLs) | ACTUAL DATA PORTION (288 TRACKS, 144 CTLs) | REAR DUMMY DATA PORTION (16 TRACKS, 8 CTLs) |

| "0"×8CTLs | START MARK (8 CTLs) | "0"×68CTLs | CUE MARK (16 CTLs) | "0"×60CTLs | END MARK (8 CTLs) |

DIGITAL VTR AND VIDEO RECORDING / REPRODUCING APPARATUS

BACKGROUND OF THE INVENTION

1. Field of the Invention

The present invention relates generally to a digital VTR (Video Tape Recorder) for intermittently recording an input image. The present invention further relates to a video recording/reproducing apparatus such as a digital VTR.

2. Description of the Prior Art

A digital VTR for storing in a memory actual data (input video/audio data or its compressed data) and recording, every time data for each block are stored, the data for the block on a magnetic tape at the time of recording, while intermittently reading out the data recorded on the magnetic tape for the block, storing in the memory the data read out of the magnetic tape, reading out the data stored in the memory, and reproducing and outputting the read data at the time of reproduction has been known.

In such a digital VTR, it is difficult to feed the magnetic tape at a speed higher than a normal reproduction speed to perform reproduction, that is, perform fast-forward play (including fast-backward play). In order to perform fast-forward play, it is necessary to previously produce data for fast-forward play on the recorded data and to use as a formatter special one having such a function.

An object of the present invention is to provide a digital VTR capable of performing fast-forward play without using as a formatter special one.

In the above-mentioned conventional digital VTR, when a new block is recorded on a block which has already been recorded from its halfway part when recording is started, the block which has already been recorded and the new block are recognized as one block at the time of reproduction. Consequently, the capacity of the one block is larger than that of one recording block previously determined.

When such a phenomenon occurs at the time of recording, data corresponding to one block which have been read out of the magnetic tape cannot be recorded on the memory at the time of reproduction, so that normal play cannot be performed. Even in such a case, a memory having a large capacity must be prepared in order to perform normal play.

An object of the present invention is to provide a digital VTR capable of preventing a new recoding block from being recorded on a recording block which has already been recorded from its halfway part when recording is started.

An image recording/reproducing apparatus for compressing an image picked up by a monitoring camera by an image compressor meeting a JPEG (Joint Photographic Expert Group) standard (hereinafter referred to as a JPEG image compressor), for example, and then recording the compressed image on a video tape, reading data recorded on the video tape, then expanding the read data by an image expander, and outputting the expanded data has already been developed.

At the time of recording, every time data representing the image compressed by the image compressor is stored in the memory, and data corresponding to one block having a predetermined capacity are stored in the memory, the data corresponding to the one block are successively read out and are recorded on the video tape. At the time of reproduction, every time the data read out of the video tape are stored in the memory, and data corresponding to one block having a predetermined capacity are stored in the memory, the data corresponding to the one block are successively read out and are fed to the image expander.

In the video recording/reproducing apparatus, a head address storing field (frame) data corresponding to each field (each frame) out of data corresponding to one block which are stored in the memory is difficult to recognize. Accordingly, it is difficult to perform special play such as reverse play, fast-forward play, or fast-backward play.

An object of the present invention is to provide a video recording/reproducing apparatus capable of performing special play such as reverse play, fast-forward play, or fast-backward play.

In the above-mentioned conventional video recording/reproducing apparatus, when a search is performed on the basis of data added to video data, field (frame) data including the added data are read out. Accordingly, it takes long to perform the search.

An object of the present invention is to provide a video recording/reproducing apparatus capable of quickly performing a search.

SUMMARY OF THE INVENTION

A first digital VTR according to the present invention is a digital VTR for storing actual data in a memory and recording, every time for each recording block comprising a front dummy data portion, an actual data portion and a rear dummy data portion, actual data corresponding to the capacity of the actual data portion in the recording block are stored in the memory, data for the recording block, that is, front dummy data, the actual data stored in the memory, and rear dummy data in this order on a magnetic tape at the time or recording, while intermittently reading out the data recorded on the magnetic tape for the recording block, storing in the memory the actual data read out of the magnetic tape, reading out the actual data stored in the memory, and reproducing and outputting the read actual data at the time of reproduction, characterized by comprising means for recording a cue mark in a position, corresponding to a predetermined position in the middle of each recording block, on a control track of the magnetic tape at the time of recording; means for stopping the acceptance of the data in the memory and accelerating a capstan motor at the time point where the actual data in the recording block are stored in predetermined amounts in the memory at the time of fast-forward play; and means for decelerating the capstan motor when the cue mark is detected.

It is preferable that the digital VTR further comprises means for recording on the control track of the magnetic tape a start mark indicating a predetermined position in the front dummy data portion in each recording block at the time of recording, and means for controlling the timing of reading of the actual data for the recording block utilizing the start mark at the time of fast-forward play.

A second digital VTR according to the present invention is a digital VTR for storing actual data in a memory and recording, every time for each recording block comprising a front dummy data portion, an actual data portion and a rear dummy data portion, actual data corresponding to the capacity of the actual data portion in the recording block are stored in the memory, data for the recording block, that is, front dummy data, the actual data stored in the memory, and rear dummy data in this order on a magnetic tape at the time or recording, while intermittently reading out the data recorded on the magnetic tape for the recording block, storing in the memory the actual data read out of the magnetic tape, reading out the actual data stored in the memory, and reproducing and outputting the read actual data at the time of reproduction, comprising a circuit for recording a cue mark in a position, corresponding to a predetermined position in the middle of each recording block, on a control track of the magnetic tape at the time of recording; a circuit for stopping the acceptance of the data in the memory and accelerating a capstan motor at the time point where the actual data in the recording block are stored in predetermined amounts in the memory at the time of fast-forward play; and a circuit for decelerating the capstan motor when the cue mark is detected.

It is preferable that the digital VTR further comprises a circuit for recording on the control track of the magnetic tape a start mark indicating a predetermined position in the front dummy data portion in each recording block at the time of recording, and a circuit for controlling the timing of reading of the actual data for the recording block utilizing the start mark at the time of fast-forward play.

A third digital VTR according to the present invention is a digital VTR for storing actual data in a memory and recording, every time for each recording block comprising a front dummy data portion, an actual data portion and a rear dummy data portion, actual data corresponding to the capacity of the actual data portion in the recording block are stored in the memory, data in one recording block, that is, front dummy data, the actual data stored in the memory, and rear dummy data in this order on a magnetic tape at the time or recording, while intermittently reading out the data recorded on the magnetic tape for the recording block, storing in the memory the actual data read out of the magnetic tape, reading out the actual data stored in the memory, and reproducing and outputting the read actual data at the time of reproduction, characterized by comprising means for recording a start mark indicating a predetermined position in the front dummy data portion in the recording block and an end mark indicating a predetermined position in the rear dummy data portion in the recording block on a control track of the magnetic tape at the time of recording; means for controlling the timing of acceptance of the actual data for the recording block utilizing the start mark and the end mark at the time of reproduction; and means for causing the magnetic tape to travel to detect the end mark immediately after the recording is started, stopping the tape when the end mark is detected, and then starting a recording operation.

A fourth digital VTR according to the present invention is a digital VTR for storing actual data in a memory and recording, every time for each recording block comprising a front dummy data portion, an actual data portion and a rear dummy data portion, actual data corresponding to the capacity of the actual data portion in the recording block are stored in the memory, data for the recording block, that is, front dummy data, the actual data stored in the memory, and rear dummy data in this order on a magnetic tape at the time or recording, while intermittently reading out the data recorded on the magnetic tape for the recording block, storing in the memory the actual data read out of the magnetic tape, reading out the actual data stored in the memory, and reproducing and outputting the read actual data at the time of reproduction, characterized by comprising a circuit for recording a start mark indicating a predetermined position in the front dummy data portion in the recording block and an end mark indicating a predetermined position in the rear dummy data portion in the recording block on a control track of the magnetic tape at the time of recording; a circuit for controlling the timing of acceptance of the actual data for the recording block utilizing the start mark and the end mark at the time of reproduction; and a circuit for causing the magnetic tape to travel to detect the end mark immediately after the recording is started, stopping the tape when the end mark is detected, and then starting a recording operation.

A fifth digital VTR according to the present invention is a digital VTR for storing actual data in a memory and recording, every time for each recording block comprising a front dummy data portion, an actual data portion and a rear dummy data portion, actual data corresponding to the capacity of the actual data portion in the recording block are stored in the memory, data for the recording block, that is, front dummy data, the actual data stored in the memory, and rear dummy data in this order on a magnetic tape at the time or recording, while intermittently reading out the data recorded on the magnetic tape for the recording block, storing in the memory the actual data read out of the magnetic tape, reading out the actual data stored in the memory, and reproducing and outputting the read actual data at the time of reproduction, characterized by comprising means for recording a start mark indicating a predetermined position in the front dummy data portion in the recording block and an end mark indicating a predetermined position in the rear dummy data portion in the recording block on a control track of the magnetic tape at the time of recording; means for controlling the timing of acceptance of the actual data for the recording block utilizing the start mark and the end mark at the time of reproduction; and means for adjusting, when the magnetic tape is inserted, a tape position such that the position where the subsequent recording is started on the magnetic tape is the rear dummy data portion in the recording block which has already been recorded on the magnetic tape.

An example of the means for adjusting the tape position is one comprising means for causing the magnetic tape to travel in the forward direction, means for stopping the travel of the magnetic tape when the end mark is detected within a predetermined time period, and means for stopping the travel of the magnetic tape when the end mark is not detected even if the predetermined time period has elapsed.

A sixth digital VTR according to the present invention is a digital VTR for storing actual data in a memory and recording, every time for each recording block comprising a front dummy data portion, an actual data portion and a rear dummy data portion, actual data corresponding to the capacity of the actual data portion in the recording block are stored in the memory, data for the recording block, that is, front dummy data, the actual data stored in the memory, and rear dummy data in this order on a magnetic tape at the time or recording, while intermittently reading out the data recorded on the magnetic tape for the recording block, storing in the memory the actual data read out of the magnetic tape, reading out the actual data stored in the memory, and reproducing and outputting the read actual data at the time of reproduction, characterized by comprising a circuit for recording a start mark indicating a predetermined position in the front dummy data portion in the recording block and an end mark indicating a predetermined position in the rear dummy data portion in the recording block on a control track of the magnetic tape at the time of recording; a circuit for controlling the timing of acceptance of the actual data for the recording block utilizing the start mark and the end mark at the time of reproduction; and a circuit for adjusting, when the magnetic tape is inserted, a tape position such that the position where the subsequent recording is started on the magnetic tape is the rear dummy data portion in the recording block which has already been recorded on the magnetic tape.

An example of the circuit for adjusting the tape position is one comprising a circuit for causing the magnetic tape to travel in the forward direction, a circuit for stopping the travel of the magnetic tape when the end mark is detected within a predetermined time period, and a circuit for stopping the travel of the magnetic tape when the end mark is not detected even if the predetermined time period has elapsed.

In a video recording/reproducing apparatus for recording input video data or its compressed data on a recording medium for each block including data corresponding to a plurality of fields at the time of recording, a first video recording/reproducing apparatus according to the present invention is characterized by comprising a memory comprising a main bank and a sub-bank; first means for reading the data for each block from the recording medium and storing the read data in the main bank in the memory; second means for storing, when the data for the block are stored in the main bank in the memory, a head address assigned to the head of field data corresponding to each of fields included in the block in the sub-bank in the memory; third means for designating an address in the sub-bank; and fourth means for reading out, when the address in the sub-bank is designated, the head address stored in the designated address in the sub-bank and reading out the field data from the read head address.

An example of the third means is one comprising means for designating the addresses in the sub-bank such that the field data are read out of the block including the data stored in the main bank in the order written into the main bank at the time of normal play.

An example of the third means is one comprising means for designating the addresses in the sub-bank such that the field data are read out of the block including the data stored in the main bank in the order reverse to the order written into the main bank at the time of reverse play.

An example of the third means is one comprising means for designating the addresses in the sub-bank such that the field data are read out of the block including the data stored in the main bank in the same order as the order written into the main bank and every a predetermined number of fields at the time of fast-forward play.

An example of the third means is one comprising means for designating the addresses in the sub-bank such that the field data are read out of the block including the data stored in the main bank in the order reverse to the order written into the main bank and every a predetermined number of fields at the time of fast-backward play.

In a video recording/reproducing apparatus for recording on a recording medium input video data or its compressed data with additional information added to its head for each block including data corresponding to a plurality of fields and for each of the fields included in the block at the time of recording, a second video recording/reproducing apparatus is characterized by comprising a memory comprising a main bank and a sub-bank; first means for reading the data for each block from the recording medium and storing the read data in the main bank in the memory at the time of a search; second means for storing, when the data for the block are stored in the main bank in the memory, a head address assigned to the head of each of field data corresponding to fields included in the block in the sub-bank in the memory; third means for successively reading out only the additional information utilizing the head address assigned to the head of each of the field data stored in the sub-bank out of the field data included in the blocks stored in the main bank and searching the field which is a search object on the basis of the read additional information; and fourth means for reading out the field data corresponding to the searched field from the main bank, and reproducing and outputting the read field data.

In a video recording/reproducing apparatus for recording on a video tape input video data or its compressed data in such a manner as to add, for each block including data corresponding to a plurality of fields and for each of the fields included in the block, additional information including recording time information at the head of the block and recording for the block VASS data representing the recording time information at the head of the block on a control track of the video tape at the time of recording, a third video recording/reproducing apparatus according to the present invention is characterized by comprising a memory comprising a memory bank and a sub-bank; first means for specifying, when recording time is designated in order to perform a search by designating the recording time, the block corresponding to the designated recording time on the basis of the VASS data, and storing the data in the block in the main bank in the memory; second means for storing, when the data in the block are stored in the main bank in the memory, a head address assigned to the head of each of field data corresponding to the fields included in the block in the sub-bank in the memory; third means for searching the field having the recording time information corresponding to the designated recording time out of the plurality of field data included in the block stored in the main bank by a binary search; and fourth means for reading out the field data corresponding to the searched field from the main bank, and reproducing and outputting the read field data, the third means reading out only the additional information in each of the field data included in the block stored in the main bank utilizing the head address assigned to the head of each of the field data stored in the sub-bank at the time of the binary search.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

[A] Description of First Embodiment

Description is made of an embodiment in a case where the present invention is applied to a digital VTR used for a monitoring system.

[1] Description of Configuration of Digital VTR

Figure 1:
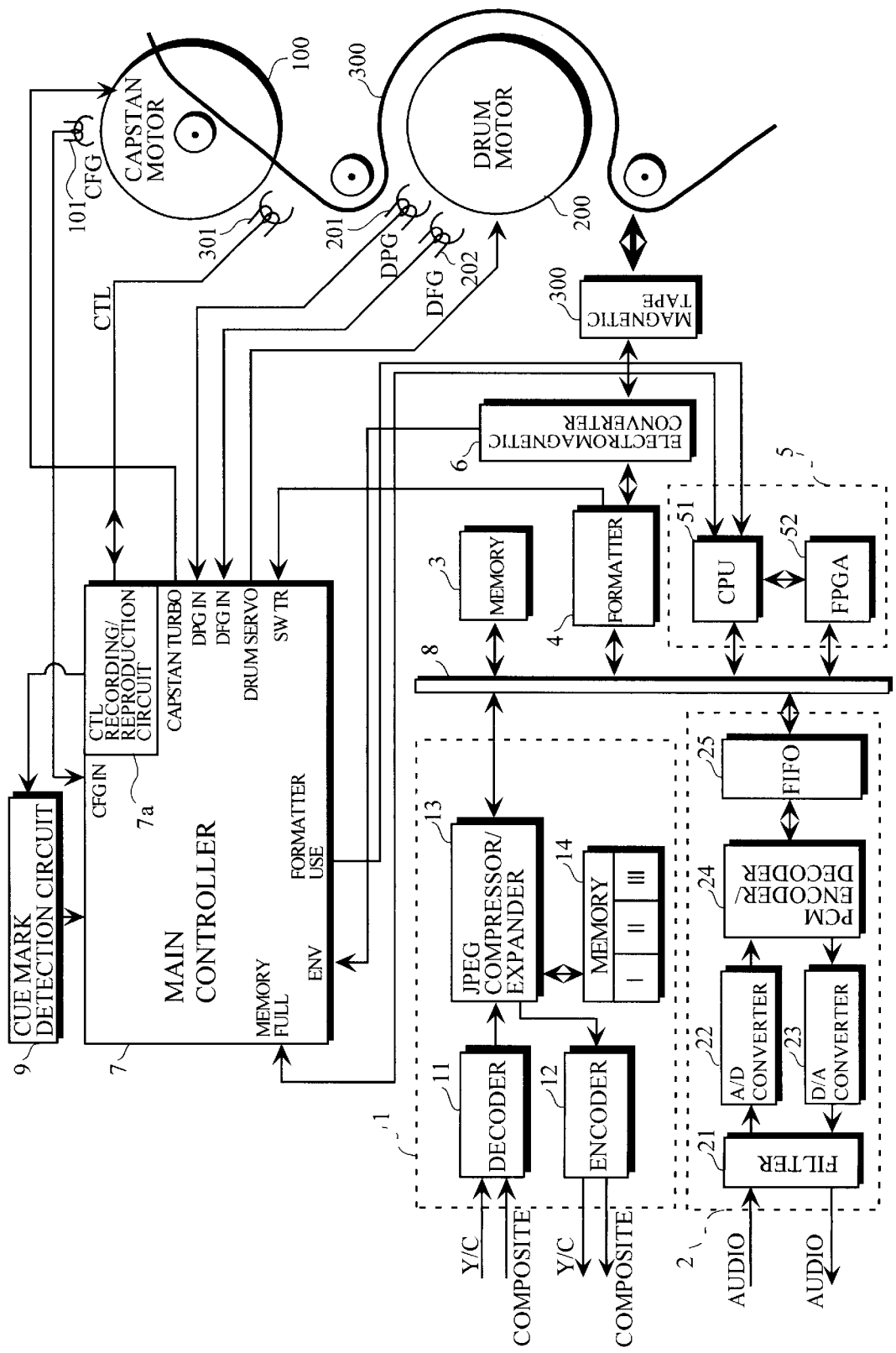
FIG. 1 is a block diagram showing the configuration of a digital VTR.

FIG. 1 illustrates the configuration of a digital VTR.

The digital VTR comprises a video processor 1, an audio processor 2, a memory 3, a formatter 4, a sub-controller 5, an electromagnetic converter 6, a main controller 7, a cue mark detection circuit 9, and so forth.

The main controller 7 is composed of a microcomputer, and comprises the function of a system controller and the function of a servo block. The main controller 7 controls a capstan motor 100 on the basis of an output of a capstan frequency generator (CFG) 101, a control signal (a CTL signal), and so forth, and controls a drum motor 200 on the basis of an output of a drum phase generator (DPG) 201, an output of a drum frequency generator (DFG) 202, and so forth.

A CTL recording/reproduction circuit 7a in the main controller 7 records the CTL signal on a control track of a magnetic tape 300 using a CTL head 301 at the time of recording, while reading the CTL signal from the control track of the magnetic tape 300 using the CTL head 301 at the time of reproduction. The cue mark detection circuit 9 is for detecting a cue mark, described later, on the basis of the CTL signal read from the magnetic tape 300 by the CTL recording/reproduction circuit 7a at the time of fast-forward play or fast-backward play.

The video processor 1 comprises a decoder 11, an encoder 12, a compressor/expander meeting a JPEG (Joint Photographic Expert Group) standard (hereinafter referred to as a JPEG compressor/expander) 13, and a memory for compression/expansion processing 14. The memory 14 is divided into areas I and II which respectively have a capacity corresponding to one field and into which input data is to be alternately written and an area III storing data after JPEG compression.

The audio processor 2 comprises a filter 21, an analog-to-digital (A/D) converter 22, a digital-to-analog (D/A) converter 23, a PCM (Pulse Coded Modulation) encoder/decoder 24, and an FIFO (Fast-in Fast-out) memory 25. The sub-controller 5 comprises a CPU 51 and an FPGA (Field Programmable Gate Array) 52. The video processor 1, the audio processor 2, the memory 3, the formatter 4, and the sub-controller 5 are connected to one another through a data bus line 8. The sub-controller 5 is connected to the main controller 7.

[2] Description of Recording Operation

Description is made of the recording operation of the VTR. In the present embodiment, a format for recording on a magnetic tape is taken as D-VHS (Digital-Video Home System), one recording block is taken as 366 tracks, and the capacity of the memory 3 is taken as 64 megabits (8 megabytes).

At the time of recording, the main controller 7 carries out control so as to rotate the capstan motor 100 and the drum motor 200 at a predetermined speed. Further, the CTL signal is recorded on the control track of the magnetic tape 300 by the CTL recording/reproduction circuit 7a.

A composite video signal of an NTSC (National Television System Standard Committee) type from a monitoring camera (a video camera) (not shown) or a Y/C component signal which has been separated into a luminance signal and a chrominance signal is inputted to the decoder 11. The decoder 11 converts the inputted video signal into a YUV signal, and converts the obtained YUV signal into digital YUV data.

The digital YUV data obtained by the decoder 11 is fed to the compressor/expander 13 for compressing and expanding input/output (I/O) data according to the JPEG standard. The compressor/expander 13 alternately accepts in the areas I and II in the memory 14 the digital YUV data for each field designated by recording interval information fed from the CPU 51 via the data bus line 8. The digital YUV data accepted in the memory 14 is compressed by the compressor/expander 13. Compressed video data obtained by the compression is written into the area III in the memory 14.

The compressed video data corresponding to one field which has been written into the area III in the memory 14 is read out of the area III in the memory 14 by the compressor/expander 13 on the basis of a control instruction fed from the CPU 51 via the data bus line 8, and is written into the memory 3 via the data bus line 8. In this case, the compressed video data is written into the memory 3 with Q table data and an area identification code for identifying a video data area added thereto by the FPGA 52.

On the other hand, an audio signal from the video camera (not shown) is continuously inputted to the filter 21 in the audio processor 2. The filter 21 removes a high-frequency noise component of the audio signal, and outputs the band-limited audio signal to the A/D converter 22. The A/D converter 22 converts the band-limited audio signal into a digital audio signal. The digital audio signal obtained by the A/D converter 22 is continuously fed to the PCM encoder/decoder 24.

The PCM encoder/decoder 24 compresses the fed digital audio signal using a PCM (Pulse Code Modulation) system. Compressed audio data obtained by the compression is written into the FIFO memory 25. The FIFO memory 25 reads out the compressed audio data which has been written for each recording interval, and writes the read compressed audio data into the memory 3 via the data bus line 8. In this case, the compressed audio data is written into the memory 3 with an area identification code for identifying an audio data area added thereto by the FPGA 52. Further, additional information such as a recording date and a recording interval are stored in the memory 3 from the CPU 51.

Every time data (actual data) corresponding to a predetermined recording block are stored in the memory 3, the actual data (compressed video data, compressed audio data, and additional information) are read out, and are fed to the formatter 4 via the data bus line 8. In this example, one recording block is composed of data corresponding to 366 tracks, and the data corresponding to 288 tracks are actual data, as described later. Every time the actual data corresponding to 288 tracks are stored in the memory 3, therefore, the data are read out and are fed to the formatter 4.

The data which have been format-converted by the formatter 4 are fed to the electromagnetic converter 6, and are recorded on the magnetic tape 300 through a recording amplifier and a video head in the electromagnetic converter 6. Every time the recording of the data for one recording block is terminated, the magnetic tape 300 is stopped.

Figure 2:
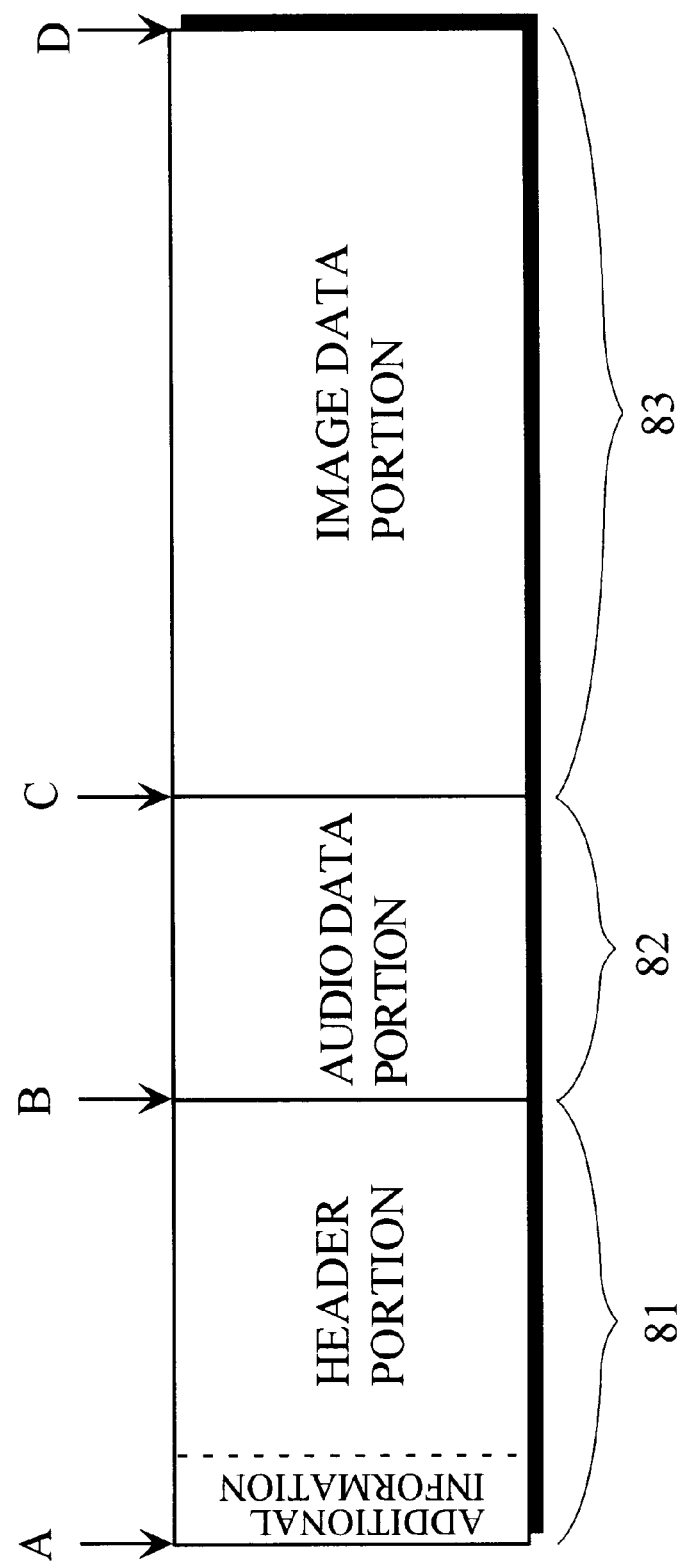
FIG. 2 is a schematic view showing a format for data corresponding to one field recorded on a magnetic tape.

FIG. 2 illustrates a format for data corresponding to one field to be recorded on the magnetic tape.

A data block corresponding to one field comprises a header portion 81, an audio data portion 82, and a video data portion 83.

The header portion 81 includes additional information such as recording time information, alarm information, or a camera number, a quantization table (Q table), voice added data, and so forth. A frame header A indicating the head of the header portion 81 is inserted into the head of the header portion 81. An area identification code B for identifying an audio data area is inserted into the head of the audio data portion 82. An area identification code C for identifying a video data area is inserted into the head of the video data portion 83. An end code D indicating the end of the video data portion 83 is inserted into the end of the video data portion 83.

Figure 3A:
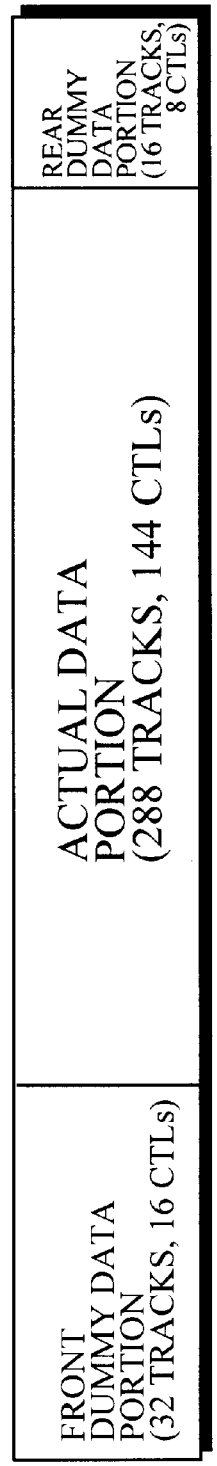
FIG. 3a is a schematic view showing the structure of one recording block recorded on a magnetic tape.
Figure 3B:
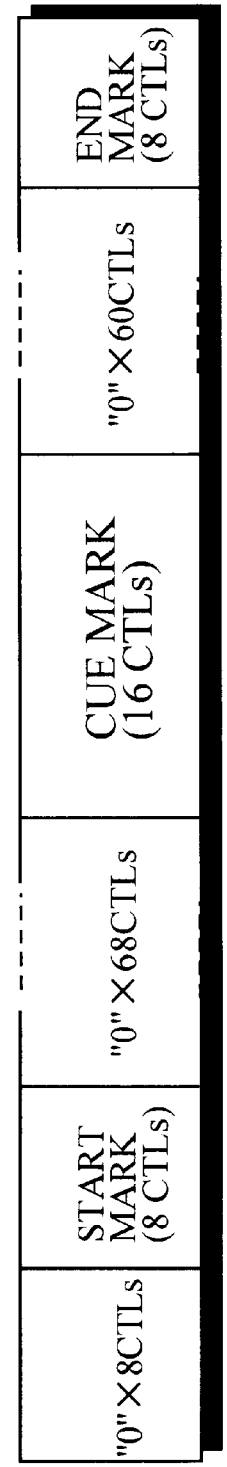
FIG. 3b is a schematic view showing the structure of CTL marking recorded on a control track of a magnetic tape.

FIG. 3 illustrates the structure of one recording block recorded on the magnetic tape and the structure of CTL marking.

One recording block comprises data corresponding to 366 tracks (corresponding to 168 CTLs) and includes data corresponding to a plurality of fields, as shown in FIG. 3(*a*). The one recording block comprises a front dummy data portion corresponding to 32 tracks (corresponding to 16 CTLs), and an actual data portion corresponding to 288 tracks (corresponding to 144 CTLs) subsequent thereto, and a rear dummy data portion corresponding to 16 tracks (corresponding to 8 CTLs).

CTL marking corresponding to the one recording block comprises 8 CTLs each representing "0" at its head, 8 CTLs representing a start mark subsequent thereto, 68 CTLs each representing "0" subsequent thereto, 16 CTLs representing a cue mark subsequent thereto, 60 CTLs each representing "0" subsequent thereto, and 8 CTLs representing an end mark subsequent thereto, as shown in FIG. 3(*b*).

The start mark is composed of "10101010" using "0" and "1" of Short S constituting a VISS/VASS signal according to a VHS (Video Home System) standard. The end mark is composed of "10101010" using "0" and "1" of Long L constituting the VISS/VASS signal according to the VHS standard.

In the VHS standard, the ratio of a time period during which the N pole is written to a time period during which the S pole is written in "0" of the Short S is defined as 57.5:42.5, and the ratio of a time period during which the N pole is written to a time period during which the S pole is written in "1" of the Short S is defined as 25.0:75.0. Further, the ratio of a time period during which the N pole is written to a time period during which the S pole is written in "0" of the Long L is defined as 62.5:37.5, and the ratio of a time period during which the N pole is written to a time period during which the S pole is written in "1" of the Long L is defined as 30.0:70.0.

Used as the cue mark is "0'0'0'0'0'0'0'0'0'0'0'0'0'0'0'0'" using "0'" which differs from "0" and "1" of the Short S and the Long L which are defined by the VHS standard in the ratio of a time period during which the N pole is written and a time period during which the S pole is written. In this example, used as "0'" composing the cue mark is "0'" at which the ratio of the time period during which the N pole is written to the time period during which the S pole is written is 80:20.

The reason for this is for preventing a judgment unit for judging normal VISS/VASS from erroneously recognizing the CTLs composing the cue mark as "0" or "1" constituting the VISS/VASS signal. Therefore, the cue mark detection circuit 9 is provided separately from the normal VISS/VASS judgment unit.

Used as "0" other than the start mark, the end mark, and the cue mark is "0" of the Short S or the Long L which is defined by the VHS standard.

The following is the reason why the start mark composed of the CTL signal is recorded not at a position corresponding to the head of one recording block but after eight CTLs each representing "0" are outputted. That is, in the VTR, the travel of the magnetic tape 300 is stopped every time data corresponding to one recording block is reproduced at the time of reproduction. Therefore, an envelope is not stabilized in a first part of the one recording block at the time of reproduction. When the start mark is recorded in the unstable position, therefore, a detection error of the start mark may occur. Therefore, the start mark is recorded in a position behind a position corresponding to the head of the one recording block.

Figure 4:
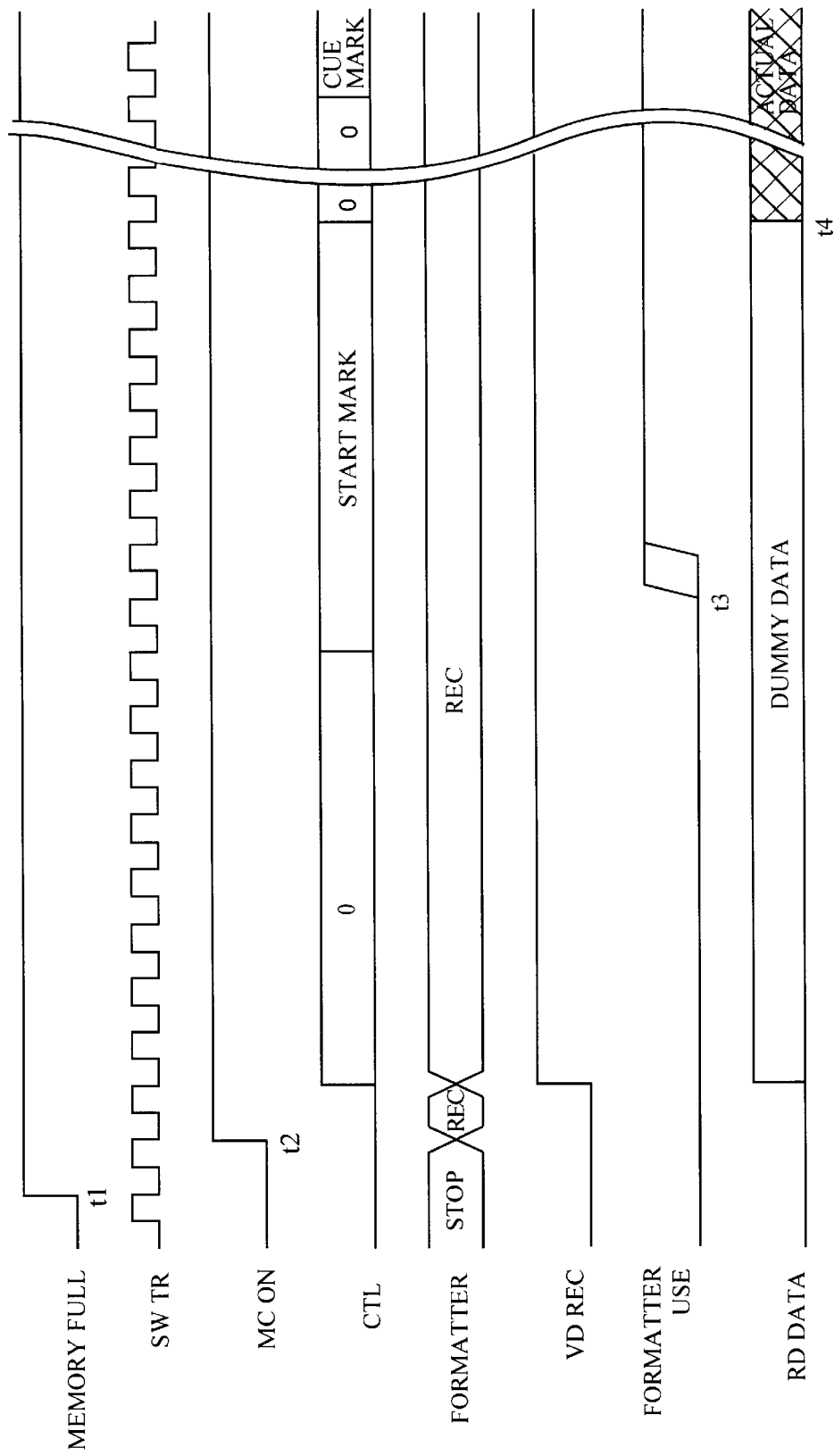
FIG. 4 is a timing chart showing signals in respective units in a case where all actual data corresponding to the capacity of an actual data portion in one recording block are written into a memory 3 after a recording operation is started.

FIG. 4 illustrates signals in the respective units in a case where all actual data corresponding to the capacity of an actual data portion in one recording block are written into the memory 3 after the recording operation is started.

In FIG. 4, a signal MEMORY FULL indicates a signal which is brought into an H level when the actual data corresponding to the capacity of the actual data portion in the one recording block are written into the memory 3, while being brought into an L level when the actual data corresponding to the capacity are read out. The signal MEMORY FULL is generated by the sub-controller 5, and is fed to the main controller 7. The signal MEMORY FULL is a recording start trigger signal in the one recording block at the time of recording, while being a reproduction start trigger signal in the one recording block at the time of reproduction.

A signal SW TR indicates a phase servo reference signal generated by the formatter 4. The signal SW TR is fed to the main controller 7 from the formatter 4.

A signal MC ON indicates a driving command signal for the capstan motor 100, and is generated by the main controller 7.

A signal CTL indicates a CTL signal which is recorded on the magnetic tape 300 at the time of recording, while being read out of the magnetic tape 300 at the time of reproduction.

A signal FORMATTER indicates a control signal fed to the formatter 4 from the main controller 7 and a signal indicating the state of the formatter 4.

A signal VD REC indicates a recording instruction signal fed to the video head in the electromagnetic converter 6 from the formatter 4.

A signal FORMATTER USE indicates a transmission command signal for feeding to the formatter 4 the actual data in the memory 3 at the time of recording, while indicating a transmission command signal for feeding the actual data from the formatter 4 to the memory 3 at the time of reproduction. The signal FORMATTER USE is generated by the main controller 7, and is fed to the sub-controller 5.

A signal RD DATA indicates recording data fed from the formatter 4 to the electromagnetic converter 6.

When the actual data corresponding to the capacity of the actual data portion in the one recording block are written into the memory 3 after the recording operation is started, the signal MEMORY FULL fed from the sub-controller 5 to the main controller 7 enters an H level.

When the signal MEMORY FULL enters an H level (at a time point t1), the main controller 7 brings the signal MC ON into an H level at the timing of the subsequent fall of the signal SW TR (at a time point t2), to drive the capstan motor 100. Further, the main controller 7 transmits a recording start command (an REC command) to the formatter 4 through the sub-controller 5.

The formatter 4 enters a recording operation mode when it receives the recording start command, to output dummy data, as indicated by RD DATA, as well as to bring the signal VD REC into an H level. Accordingly, the recording of the dummy data on the magnetic tape 300 is started by the video head in the electromagnetic converter 6. Further, the recording of the CTL signal on the magnetic tape 300 by the CTL recording/reproduction circuit 7a is started.

Thereafter, the main controller 7 brings the signal FORMATTER USE fed to the sub-controller 5 into an H level at predetermined timing (t3). When the signal FORMATTER USE enters an H level, the transmission of the actual data from the memory 3 to the formatter 4 is started. In the formatter 4 meeting the D-VHS standard, a 6-track sequence must be protected in a format for D-VHS. Accordingly, the formatter 4 has a memory in its inner part. The actual data fed to the formatter 4 is stored once in the memory, and is then delayed and outputted, as indicated by RD DATA. Consequently, the actual data starts to be recorded on the magnetic tape 300 from a time point t4 delayed from the time point t3 by a predetermined time period.

The start mark composed of the CTL signal is outputted in the position where an envelope is stabilized at the time of reproduction, that is, after eight CTLs each representing "0" are outputted, and is recorded on the magnetic tape 300, as described above.

Figure 5:
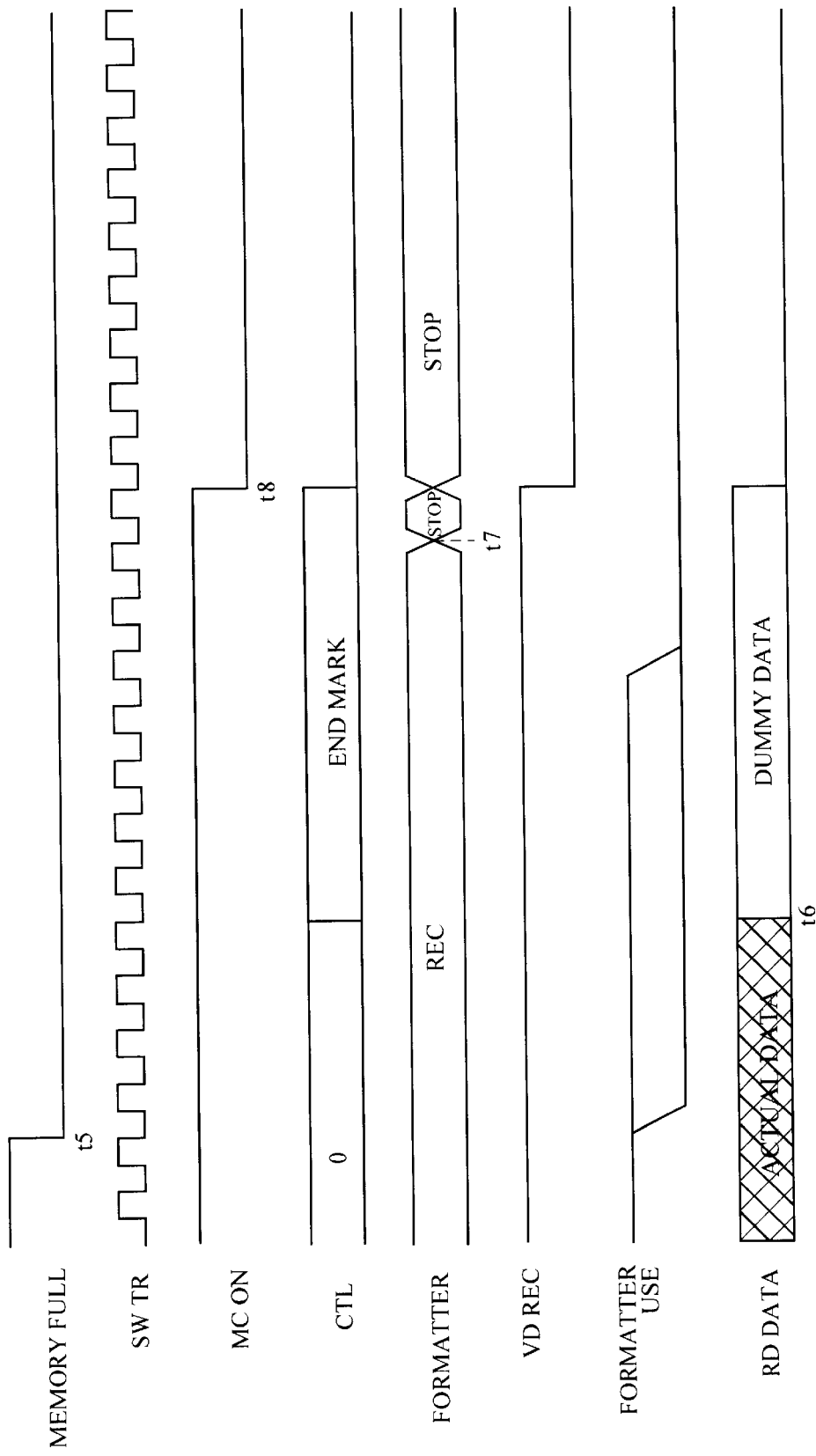
FIG. 5 is a timing chart showing signals in respective units in a case where all actual data corresponding to the capacity of an actual data portion in one recording block are read out of a memory 3 at the time of recording.

FIG. 5 illustrates the signals in the respective units in a case where all actual data corresponding to the capacity of an actual data portion in one recording block are read out of the memory 3.

When all the actual data corresponding to the capacity of the actual data portion in the one recording block are read out of the memory 3, the signal MEMORY FULL fed to the main controller 7 from the sub-controller 5 enters an L level.

When the signal MEMORY FULL enters an L level (at a time point t5), the main controller 7 brings the signal FORMATTER USE fed to the sub-controller 5 into an L level. When the signal FORMATTER USE enters an L level, the transmission of the actual data from the memory 3 to the formatter 4 is stopped. However, the data fed to the formatter 4 is delayed and outputted, as described above. Accordingly, the actual data is fed to the electromagnetic converter 6 from the formatter 4 even after the time point t5 where the signal MEMORY FULL enters an L Level, as indicated by RD DATA.

When the recording of the actual data on the magnetic tape 300 is terminated (at a time point t6) the formatter 4 feeds predetermined amounts of dummy data to the electromagnetic converter 6. From the time point where the recording of the actual data on the magnetic tape 300 is terminated (at a time point t6), and the recording of the dummy data is started, the recording of an end mark composed of the CTL signal is started.

The main controller 7 feeds a recording stop command (a stop command) to the formatter 4 through the sub-controller 5 at predetermined timing (at a time point 7) after the time point t5 where the signal MEMORY FULL enters an L level. The formatter 4 enters a stopped state and brings the signal VD REC into an L level when it receives the recording stop command, so that the recording on the magnetic tape 300 by the video head in the electromagnetic converter 6 is stopped.

The main controller 7 brings the signal MC ON into an L level and stops the capstan motor 100 at timing at which the formatter 4 stops the recording operation (at a time point t8). Further, the main controller 7 stops the recording of the CTL signal on the magnetic tape 300 by the CTL recording/reproduction circuit 7a.

[3] Description of Reproduction Operation

At the time of reproduction, data are read out for each recording block from the magnetic tape 300 by the video head in the electromagnetic converter 6. The read data are fed to the formatter 4 through the reproduction amplifier in the electromagnetic converter 6. The formatter 4 subjects the fed data to conversion reverse to that at the time of recording. Actual data (additional information, compressed video data, and compressed audio data) obtained by the formatter 4 are written into the memory 3 through the bus line 8.

When all the actual data in the one recording block are written into the memory 3, the data are read out of the memory 3 by the FPGA 52 in accordance with a reading instruction from the CPU 51. The Q table data and the compressed video data which have been read out of the memory 3 are respectively fed to the compressor/expander 13 and the area III in the memory 14 via the compressor/expander 13. Further, the compressed audio data which has been read out of the memory 3 is fed to the FIFO memory 25.

The compressed video data which has been fed to the area III in the memory 14 is expanded by the compressor/expander 13 on the basis of the Q table data. The digital YUV data for each field obtained after the expansion processing by the compressor/expander 13 is alternately written into the areas I and II in the memory 14.

The digital YUV data which has been written into the area I or II in the memory 14 is read out by the compressor/expander 13, and is fed to the encoder 12. The encoder 12 converts the digital YUV data into analog YUV data, and encodes the obtained analog YUV data, to output a composite video signal and a Y/C component signal thus obtained.

On the other hand, the compressed audio data which has been written into the FIFO memory 25 is decoded by the PCM encoder/decoder 24, and is fed to the D/A converter 23. The D/A converter 23 converts the digital audio data into an analog audio signal, to output the obtained analog audio signal to the filter 21. The filter 21 removes a high-frequency noise component generated at the time of the D/A conversion by the D/A converter 23 from the fed analog audio signal, to output an obtained analog audio signal.

Immediately after the reproduction is started, the main controller 7 drives the capstan motor 100, taking the signal MC ON as an H-level signal. Consequently, the data read out of the magnetic tape 300 are written into the memory 3. When the end mark is detected from the magnetic tape 300, the main controller 7 stops the capstan motor 100, taking the signal MC ON as an L-level signal.

When certain amounts of data are stored in the memory 3 after the capstan motor 100 is driven, the data are successively read out of the memory 3. The Q table data and the compressed video data which have been read out of the memory 3 are fed to the video processor 1, and are outputted after being subjected to the above-mentioned processing. The compressed audio data which has been read out of the memory 3 is fed to the audio processor 2, and is outputted after being subjected to the above-mentioned processing.

Figure 6:
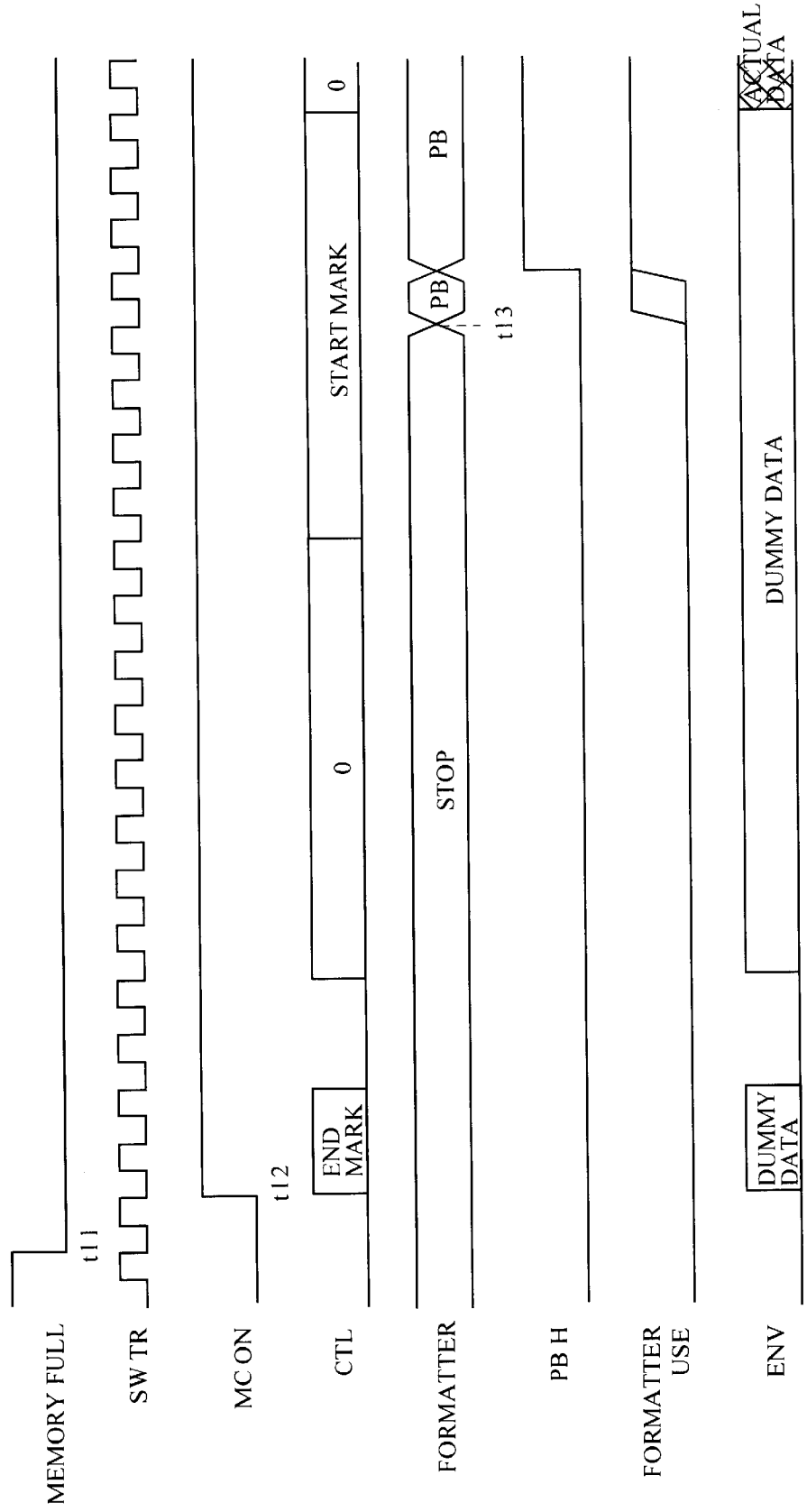
FIG. 6 is a timing chart showing signals in respective units in a case where all actual data corresponding to the capacity of an actual data portion in one recording block which have been written into a memory 3 are read out of the memory 3 at the time of reproduction.

FIG. 6 illustrates signals in the respective units in a case where all actual data corresponding to the capacity of an actual data portion in one recording block which have been written into the memory 3 are read out of the memory 3 at the time of reproduction.

In FIG. 6, a signal ENV indicates data read out of the magnetic tape 300 at the time of reproduction. A signal PB H indicates that an internal video circuit is in a state where it can accept a reproduced image in the memory 3.

When all the data corresponding to the total amount of the actual data in one recording block which have been written into the memory 3 are read out of the memory 3, the signal MEMORY FULL enters an L level. When the signal MEMORY FULL enters an L level (at a time point t11), the main controller 7 brings the signal MC ON into an H level at the timing of the subsequent fall of the signal SW TR (at a time point t12), to drive the capstan motor 100. Thereafter, the reproduction of the CTL signal by the CTL recording/reproduction circuit 7a is started.

Thereafter, the main controller 7 feeds, when it detects "10" in a start mark "10101010" composed of the CTL signal twice (at a time point t13), a reproduction start command (a PB command) to the formatter 4 through the sub-controller 5, and brings the signal PB H into an H level. Further, the main controller 7 brings the signal FORMATTER USE fed to the sub-controller 5 into an H level.

The formatter 4 enters a reproduction operation mode when it receives the reproduction start command. When the signal FORMATTER USE enters an H level, the transmission of the actual data from the formatter 4 to the memory 3 is started. When certain amounts of data are written into the memory 3, the data are successively read out of the memory 3.

Figure 7:
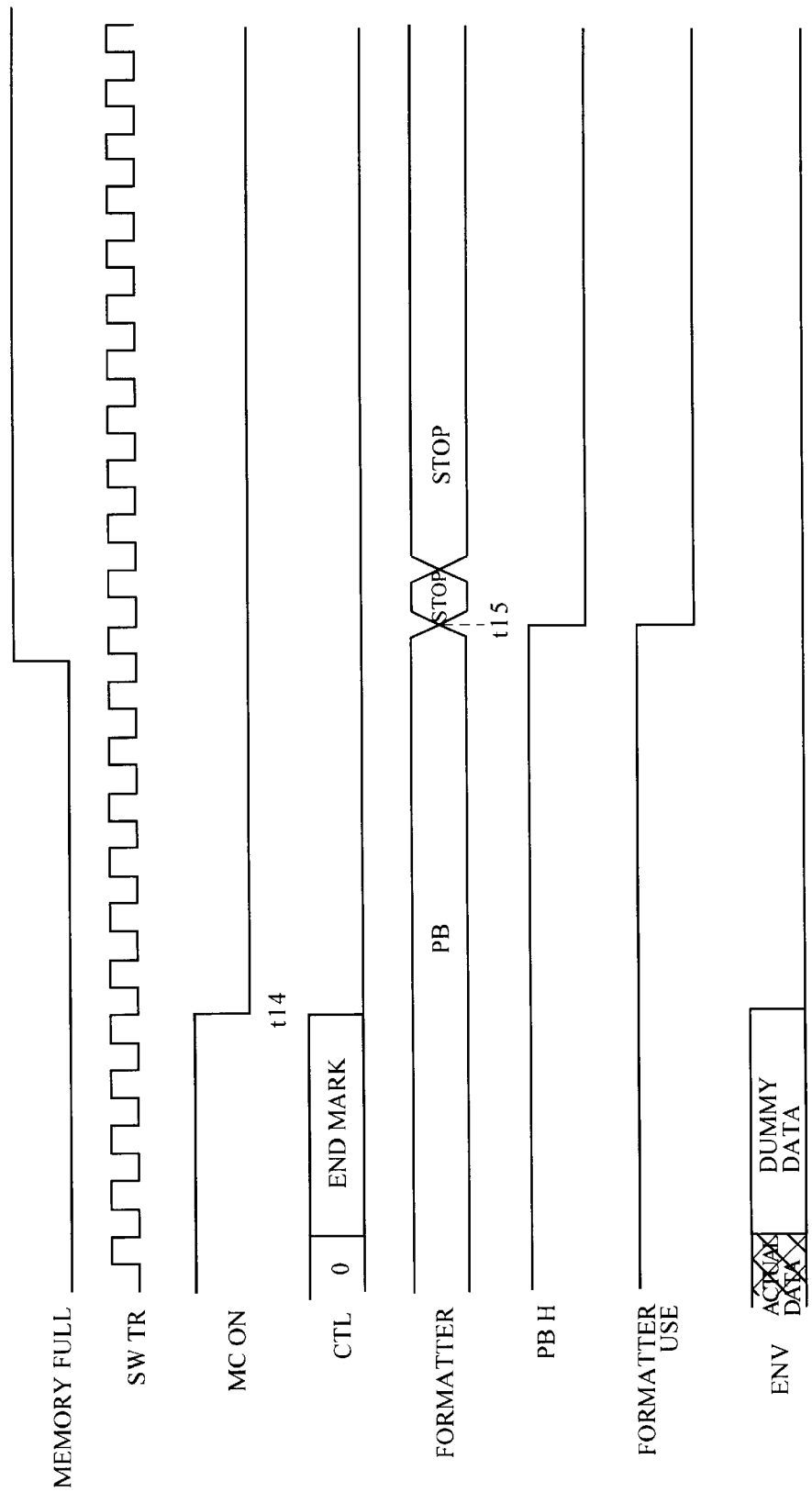
FIG. 7 is a timing chart showing signals in respective units in a case where an end mark composed of a CTL signal is detected while actual data in one recording block are being written into a memory 3 at the time of reproduction.

FIG. 7 illustrates the signals in the respective units in a case where an end mark composed of the CTL signal is detected while actual data in one recording block are being written into the memory 3 at the time of reproduction.

When the main controller 7 detects "10" in the end mark "10101010" composed of the CTL signal twice while the actual data in one recording block are being written into the memory 3 (at a time point t14) the main controller 7 brings the signal MC ON into an L level, to stop the capstan motor 100. Therefore, the magnetic tape 300 is stopped in a halfway part of the rear dummy data portion in the recording block.

The main controller 7 feeds a reproduction stop command (a STOP command) to the formatter 4 through the sub-controller 5 and brings the signal PB H into an L level at predetermined timing (at a time point t15) after the time point t14 where "10" in the end mark "10101010" is detected twice. Further, the main controller 7 brings the signal FORMATTER USE fed to the sub-controller 5 into an L level.

The formatter 4 enters a stop mode when it receives the reproduction stop command. When the signal FORMATTER USE enters an L level, the transmission of the actual data from the formatter 4 to the memory 3 is stopped.

According to the above-mentioned embodiment, in the digital VTR for recording data for each recording block, a start point and an end point of the recording block where a servo system and a mechanism system are stabilized are respectively recorded as a start mark and an end mark on the control track at the time of recording. Accordingly, stable recording/reproduction for the recording block can be performed. Further, the formatter is operated after an envelope is stabilized, thereby making it possible to prevent the formatter from being erroneously operated.

[4] Description of Fast-Forward Play (Fast-Backward Play) Operation

[4-1] Description of Fast-Forward Play Operation

Figure 8:
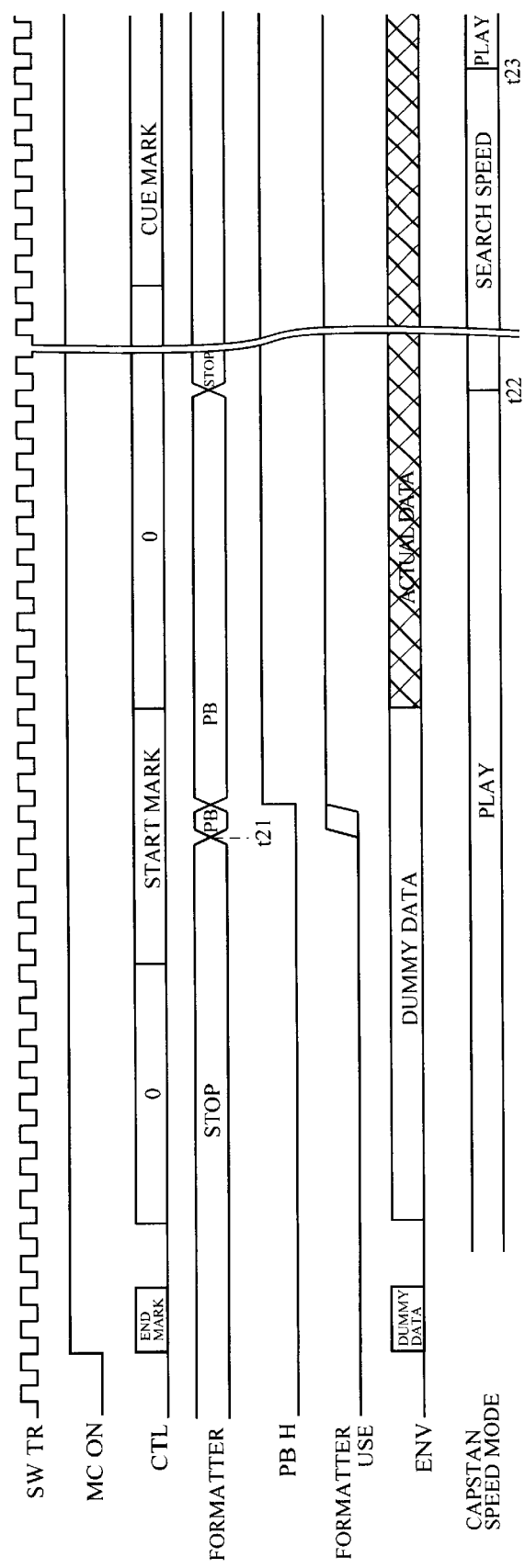
FIG. 8 is a timing chart showing signals in respective units at the time of fast-forward play.
Figure 9:
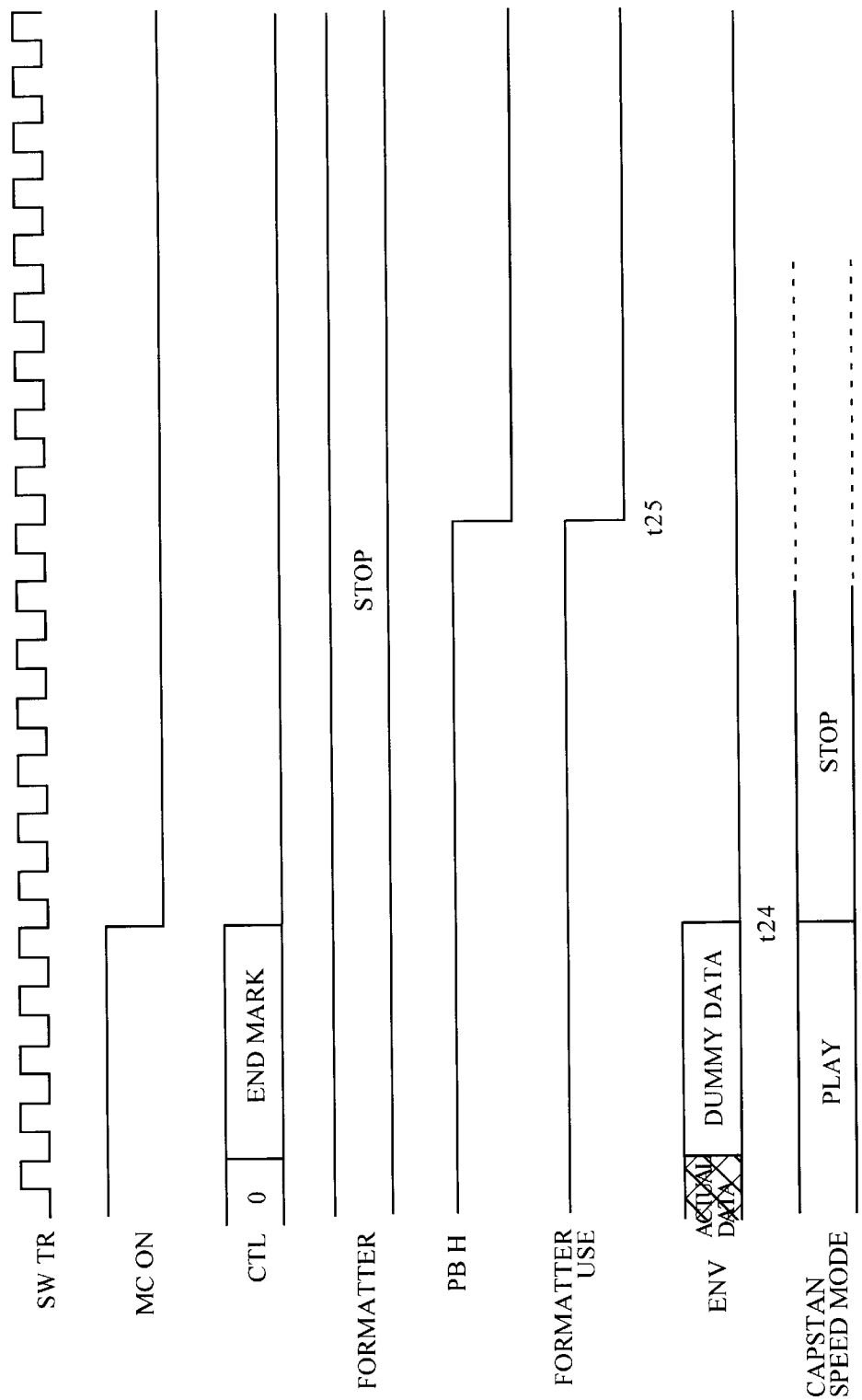
FIG. 9 is a timing chart showing signals in respective units at the time of fast-forward play.

FIGS. 8 and 9 illustrate signals in the respective units at the time of fast-forward play.

Even at the time of fast-forward play, the capstan motor 100 is driven in the same manner as that at the time of reproduction described in the above-mentioned item [3].

Thereafter, the main controller 7 feeds, when it detects "10" in a start mark "10101010" composed of the CTL signal twice (at a time point t21), a reproduction start command (a PB command) to the formatter 4 through the sub-controller 5, and brings the signal PB H into an H level. Further, the main controller 7 brings the signal FORMATTER USE fed to the sub-controller 5 into an H level.

The formatter 4 enters a reproduction operation mode when it receives the reproduction start command. When the signal FORMATTER USE enters an H level, the transmission of the actual data from the formatter 4 to the memory 3 is started. When certain amounts of data are written into the memory 3, the data are successively read out of the memory 3.

At a time point (t22) where predetermined amounts of actual data are stored in the memory 3, that is, actual data corresponding to 0.5 seconds (15 CTLs=30 tracks) are stored in the memory 3 in this example, the main controller 7 issues an acceleration command for accelerating the capstan motor 100. Consequently, the speed mode of the capstan motor 100 is changed from a play mode (a normal reproduction speed mode) to a search speed mode higher than the play mode.

The main controller 7 feeds a stop command to the formatter 4 at the time point t22 in order to prevent the formatter 4 from being erroneously operated. At the time of fast-forward play, therefore, the actual data corresponding to only 30 tracks at the head out of the actual data in the one recording block are reproduced and outputted.

Thereafter, at a time point (t23) where "0" composing a cue mark is detected by the cue mark detecting circuit 9, and 8 CTLs in the cue mark composed of 16 CTLs are confirmed by the main controller 7, the main controller 7 generates a deceleration command for decelerating the capstan motor 100. Consequently, the speed mode of the capstan motor 100 is returned from the search speed mode to the play mode. "0" composing the cue mark is detected by the cue mark detection circuit 9, and the result of the detection is fed to the main controller 7.

Thereafter, when the main controller 7 detects "10" in an end mark "10101010" composed of the CTL signal twice (at a time point t24), the main controller 7 brings the signal MC ON into an L level, to stop the capstan motor 100. Therefore, the magnetic tape 300 is stopped in a halfway part of the rear dummy data portion in the recording block.

The main controller 7 brings the signal PB H into an L level at predetermined timing (at a time point t25) after the time point t24 where "10" in the end mark "10101010" is detected twice. Further, the main controller 7 brings the signal FORMATTER USE fed to the sub-controller 5 into an L level.

Thereafter, the main controller 7 brings the signal MC ON into an H level again, to drive the capstan motor 100. The same operations are repeatedly performed.

Figure 10:
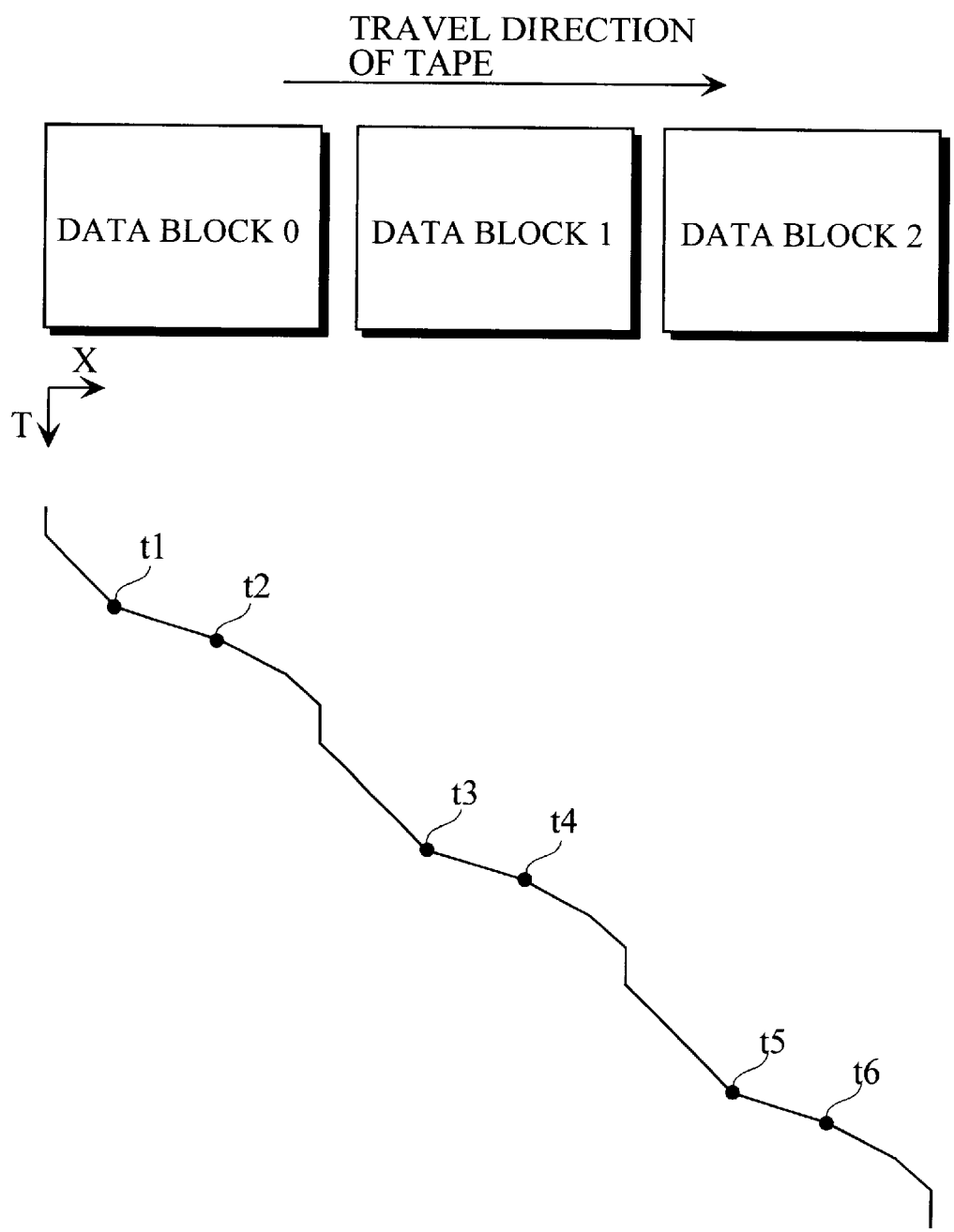
FIG. 10 is a timing chart showing the relationship between an elapse of time and a tape position at the time of fast-forward play.

FIG. 10 illustrates the relationship between an elapse of time and a tape position at the time of fast-forward play. A polygonal line in FIG. 10 represents the relationship between an elapse of time and a tape position in a case where elapsed time T is used to enter the vertical axis, and the tape position is used to enter the horizontal axis.

In FIG. 10, t1, t3, and t5 indicate time points where the capstan motor 100 is accelerated, and t2, t4, and t6 indicate positions where the capstan motor 100 is decelerated (time points where a cue mark is detected). The actual data are accepted before the time points t1, t3, and t5 where the capstan motor 100 is accelerated.

[4-2] Description of Fast-Backward Play Operation

Figure 11:
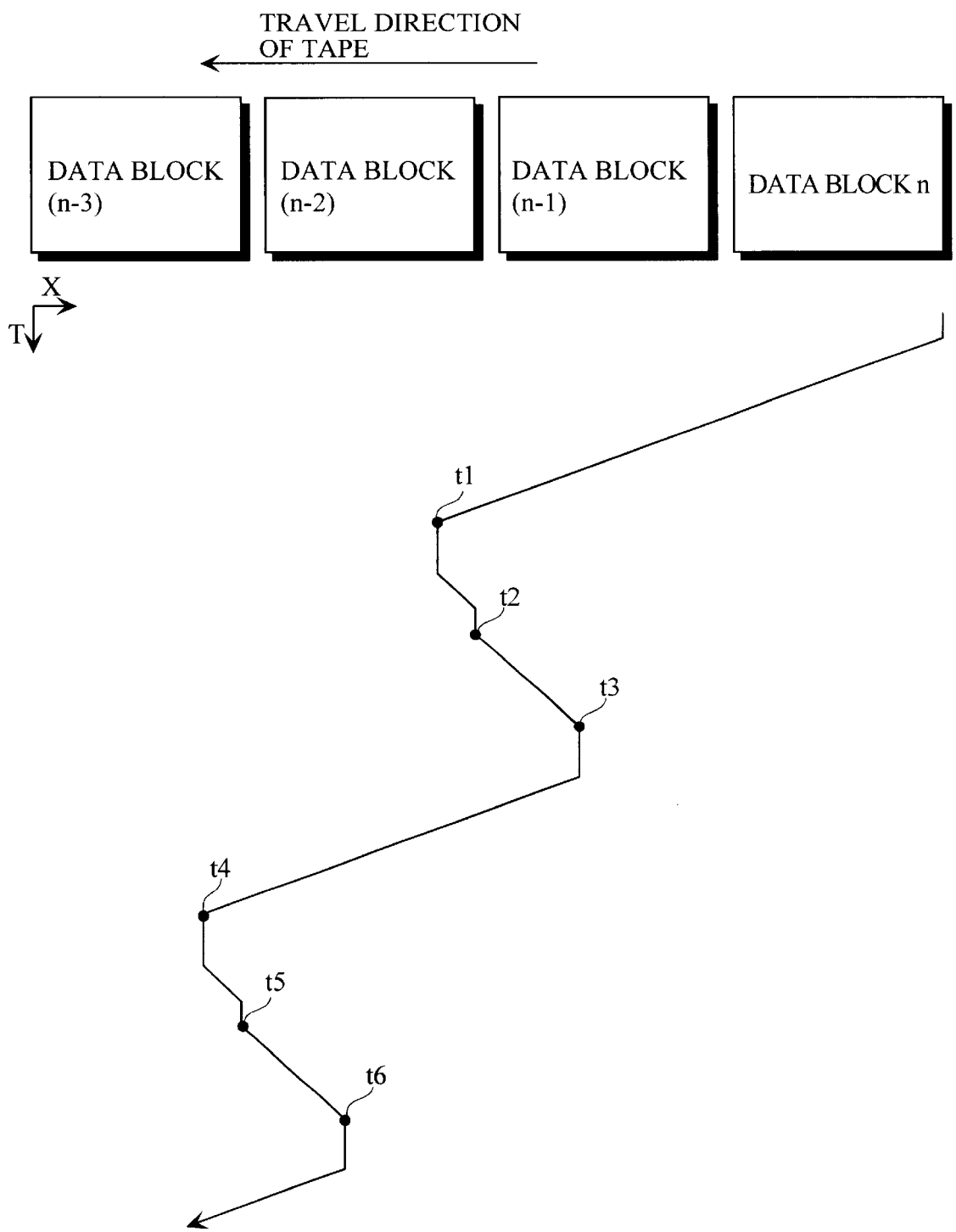
FIG. 11 is a timing chart showing the relationship between an elapse of time and a tape position at the time of fast-backward play.

FIG. 11 illustrates the relationship between an elapse of time and a tape position at the time of fast-backward play. A polygonal line in FIG. 11 represents the relationship between an elapse of time and a tape position in a case where elapsed time T is used to enter the vertical axis, and the tape position is used to enter the horizontal axis.

As shown in FIG. 11, at the time of fast-backward play, when the tape is fed in the reverse direction in a search speed mode for not less than two blocks to detect a cue mark (at a time point t1), the tape is fed in the forward direction in a normal reproduction speed mode (a play mode). When an end mark is detected (at a time point t2), the tape is stopped once, after which the tape is fed in the forward direction in the play mode again. After the start mark is detected, when the actual data are accepted only for a predetermined time period (at a time point t3), the tape is stopped. Consequently, a head part of a data block (n−1) is reproduced.

Thereafter, when the tape is fed in the reverse direction in a search speed mode for not less than two blocks, to detect a cue mark (at a time point t4), the tape is fed in the forward direction in the normal reproduction speed mode (the play mode). When an end mark is detected (at a time point t5), the tape is stopped once, after which the tape is fed in the forward direction in the play mode again. After the start mark is detected, when the actual data are accepted for a predetermined time period (at a time point t6), the tape is stopped. Consequently, a head part of a data block (n−2) is reproduced. By repeating the foregoing operations, the fast-backward play is performed.

When the memory 3 is constituted by two memories (a first memory and a second memory) respectively having a capacity capable of storing actual data in one recording block, a reproduced image can be more quickly displayed when the fast-backward play is started. When the capacity of an actual data portion in one recording block is taken as one block, the actual data are alternately written into the two memories for each block at the time of recording. Every time the actual data corresponding to one block are written into the memory, the data are read out of the memory to which the actual data corresponding to the one block have been written, and are fed to the formatter 4.

At the time of normal play, the sub-controller 5 alternately writes the data fed from the formatter 4 into the two memories for each block, and reads out, every time the data corresponding to one block are written into the memory, the data from the memory to which the data corresponding to the one block have been written, to feed the read data to the JPEG compressor/expander 13.

Figure 12:
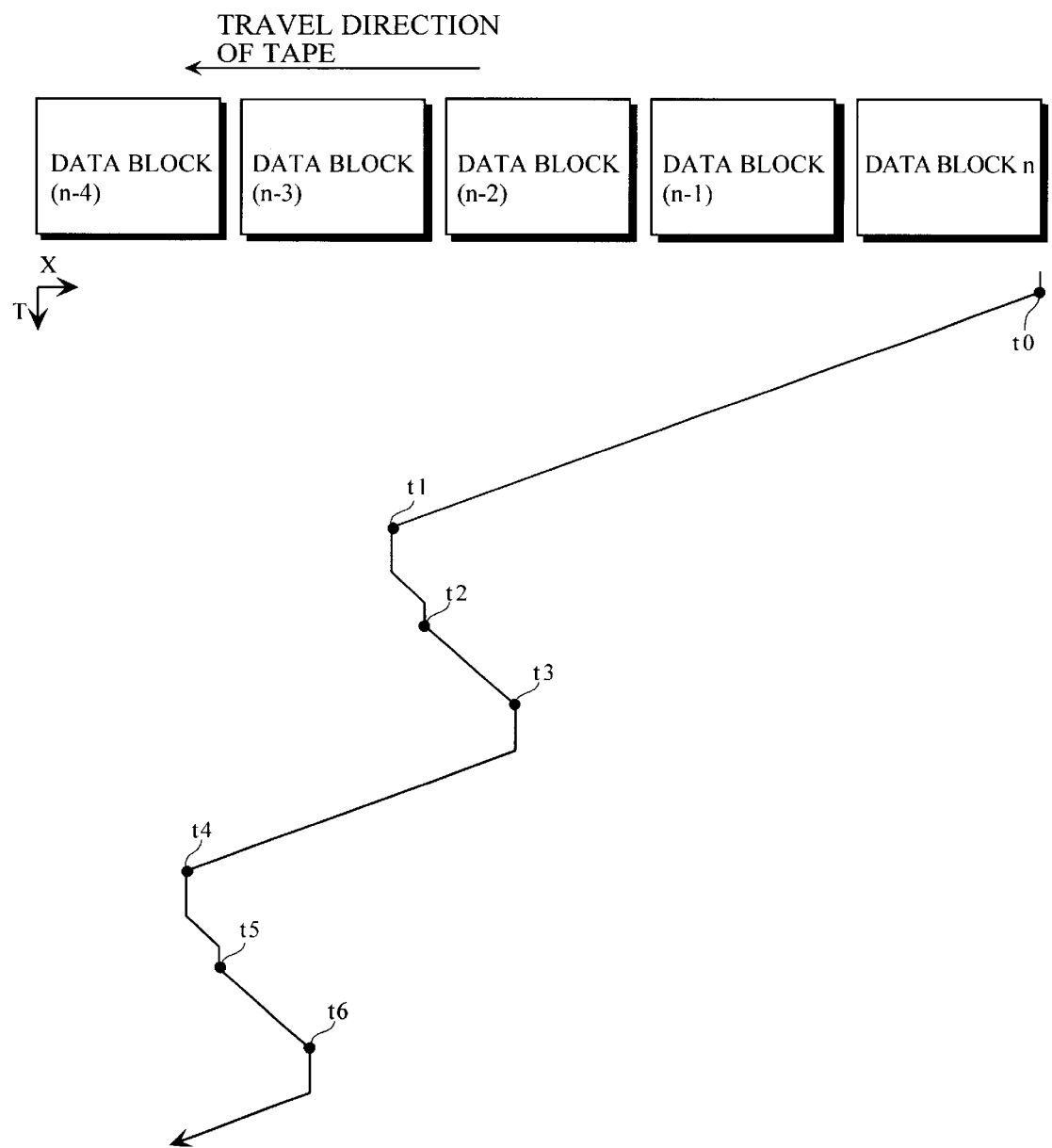
FIG. 12 is a timing chart showing the relationship between an elapse of time and a tape position at the time of fast-backward play in a case where a memory 3 is composed of two memories.

FIG. 12 illustrates the relationship between an elapse of time and a tape position at the time of fast-backward play in a case where the memory 3 is constituted by two memories. A polygonal line in FIG. 12 represents the relationship between an elapse of time and a tape position in a case where elapsed time T is used to enter the vertical axis, and the tape position is used to enter the horizontal axis.

It is assumed that a fast-backward reproduction command is entered during a normal reproduction operation. At a time point (t0) where the fast-backward reproduction command is entered, actual data corresponding to a data block n are stored in one of the two memories, and actual data corresponding to a data block (n−1) are stored in the other memory.

When the fast-backward reproduction command is entered (at the time point t0), predetermined amounts of actual data are read out of the memory storing the actual data corresponding to the data block (n−1), and are reproduced and outputted. At the same time, when the tape is fed in the reverse direction in a search speed mode for not less than three blocks, to detect a cue mark (at a time point t1), the tape is fed in the forward direction in a normal reproduction speed mode (a play mode). When an end mark is detected (at a time point t2), the tape is stopped once, after which the tape is fed again in the forward direction in the play mode. After the start mark is detected, when the actual data are accepted only for a predetermined time period (at a time point t3), the tape is stopped. Consequently, a head part of a data block (n−2) is reproduced.

The subsequent operations are the same as those shown in FIG. 11. That is, when the tape is fed in the reverse direction in the search speed mode for not less than two blocks to detect a cue mark (at a time point t4), the tape is fed in the forward direction in the normal reproduction speed mode (the play mode). When an end mark is detected (at a time point t5), the tape is stopped once, and is then fed again in the forward direction in the play mode. After the start mark is detected, when the actual data are accepted for a predetermined time period (at a time point t6), the tape is stopped. Consequently, a head part of a data block (n−3) is reproduced. By repeating the foregoing operations, the fast-backward play is performed.

[5] Description of Reverse Reproduction Operation

Figure 13:
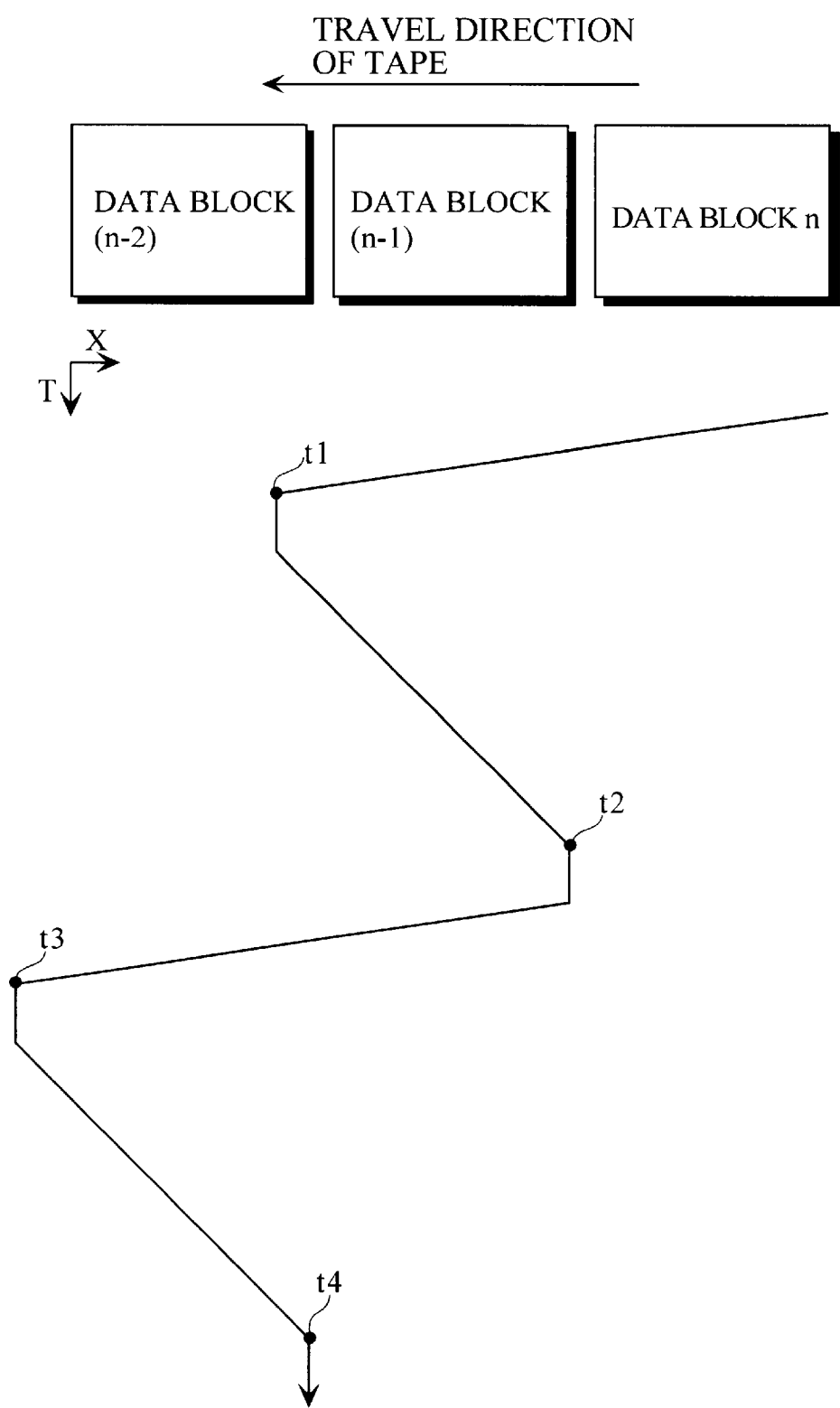
FIG. 13 is a timing chart showing the relationship between an elapse of time and a tape position at the time of reverse play.

FIG. 13 illustrates the relationship between an elapse of time and a tape position at the time of reverse play. A polygonal line in FIG. 13 represents the relationship between an elapse of time and a tape position in a case where elapsed time T is used to enter the vertical axis, and the tape position is used to enter the horizontal axis.

At the time of reverse play, when the tape is fed in the reverse direction in a search speed mode for two or more blocks to detect a cue mark (a cue mark corresponding to a data block (n−2)) (at a time point t1), the tape is fed in the forward direction in a normal reproduction speed mode (a play mode). When a start mark (a start mark corresponding to a data block (n−1)) is detected, the acceptance of actual data is started. Thereafter, when an end mark (an end mark corresponding to the data block (n−1)) is detected (at a time point t2), the tape is stopped. Consequently, a reproduction operation for the data block (n−1) is performed.

Thereafter, when the tape is fed in the reverse direction in a search speed mode for not less than two blocks, to detect a cue mark (at a time point t3), the tape is fed in the normal reproduction speed mode (the play mode) in the forward direction. When the start mark is detected, the acceptance of the actual data is started. Thereafter, when the end mark is detected (at a time point t4), the tape is stopped. Consequently, a reproduction operation for a data block (n−2) is performed. By repeating the foregoing operations, the reverse play is performed.

[6] Description of Method of Preventing New Block from being Recorded on Recording Block which has Already been Recorded from its Halfway Part when Recording is Started When a new recording block is recorded on a recording block which has already been recorded from its halfway part when recording is started, the recording block which has already been recorded and the new recording block are recognized as one recording block at the time of reproduction. Consequently, the reproduction cannot be normally performed by the above-mentioned reproduction operation.

When the recording is started, it is necessary to prevent the new recording block from being recorded on the recording block which has already been recorded from its halfway part. The method includes two methods. The methods will be described below.

[6-1] Description of First Method

In the first method, when a recording request is entered, the magnetic tape is moved in the forward direction until an end mark is detected without immediately entering a recording operation mode. Thereafter, the operation mode is switched to the recording operation mode.

Even if the magnetic tape is moved in the forward direction for not less than a predetermined time period, however, when no CTLs can be detected, it is judged that the magnetic tape is a virgin tape on which no data is recorded, to stop the magnetic tape. Thereafter, the operation mode is switched to the recording operation mode.

Figure 14:
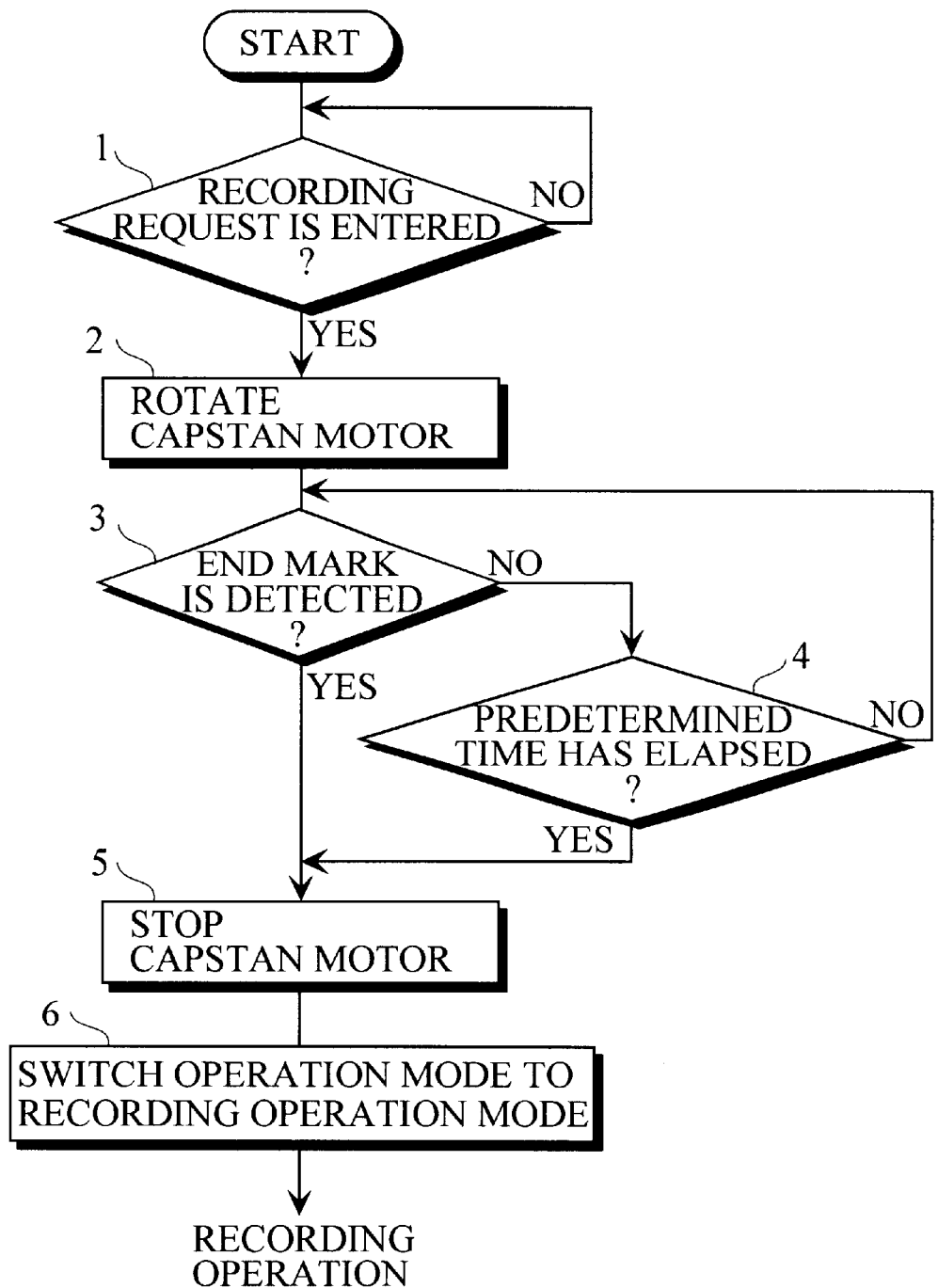
FIG. 14 is a flow chart showing the procedure for tape position adjustment processing performed when a recording request is entered.

FIG. 14 shows the procedure for tape position adjustment processing performed every time a recording request is entered.

When the recording request is entered (step 1), the capstan motor 100 is rotated in the forward direction at a normal reproduction speed (step 2). It is judged whether or not an end mark is detected on the basis of CTLs (step 3). When the end mark is detected (YES at step 3), the capstan motor 100 is stopped (step 5), to switch the operation mode to a recording operation mode (step 6). Consequently, a recording operation is started.

When the end mark is not detected even if a time period corresponding to one recording block (approximately 5.6 seconds in this example) has elapsed (YES at step 4) since the capstan motor 10 was rotated at the step 2, it is judged that the magnetic tape is a virgin tape on which no data is recorded, to stop the tape (step 5). Thereafter, the operation mode is switched to the recording operation mode (step 6). Consequently, the recording operation is started.

[6-2] Description of Second Method

In the second method, at the time of reproduction (normal play, reverse play, fast-forward play, fast-forward play, or fast-backward play), stop processing for stopping the rear dummy data portion in the recording block recorded on the tape in a video head position is performed when a stop command is entered, and tape position adjustment processing for stopping the rear dummy data portion in the recording block recorded on the tape in the video head position is performed when the tape is inserted into the VTR.

Description is made of the stop processing performed when the stop command is entered at the time of reproduction. When the stop command is entered at the time of reproduction, the capstan motor 100 is stopped once, and is then rotated in the forward direction at a normal reproduction speed. When an end mark is detected, the capstan motor 100 is stopped.

Description is made of the tape position adjustment processing performed when the tape is inserted into the VTR.

Figure 15:
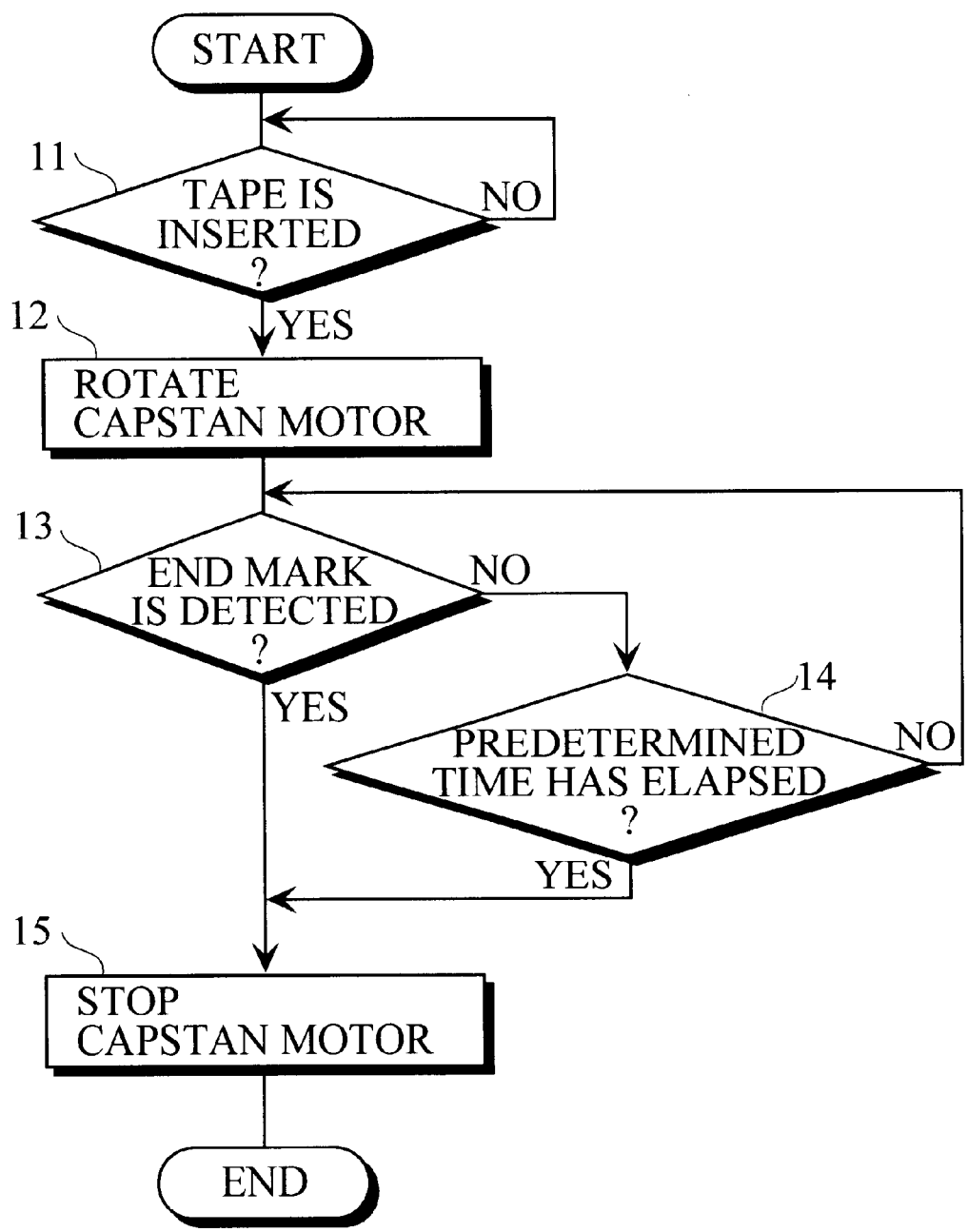
FIG. 15 is a flow chart showing the procedure for tape position adjustment processing performed when a tape is inserted into a VTR.

FIG. 15 shows the procedure for the tape position adjustment processing performed when the tape is inserted into the VTR.

When the tape is inserted into the VTR (step 11) the capstan motor 100 is rotated in the forward direction at a normal reproduction speed (step 12). It is judged whether or not an end mark is detected on the basis of CTLs (step 13). When the end mark is detected (YES at step 13), the capstan motor 100 is stopped (step 15).

When the end mark is not detected even if a time period corresponding to one recording block (approximately 5.6 seconds in this example) has elapsed (YES at step 14) since the capstan motor 100 was rotated at the step 12, it is judged that the magnetic tape is a virgin tape on which no data is recorded, to stop the tape (step 15).

[B] Description of Second Embodiment

Description is now made of an embodiment in a case where the present invention is applied to a digital VTR for recording and reproducing an image picked up by a monitoring camera.

[1] Description of Entire Configuration of Monitoring System

Figure 16:
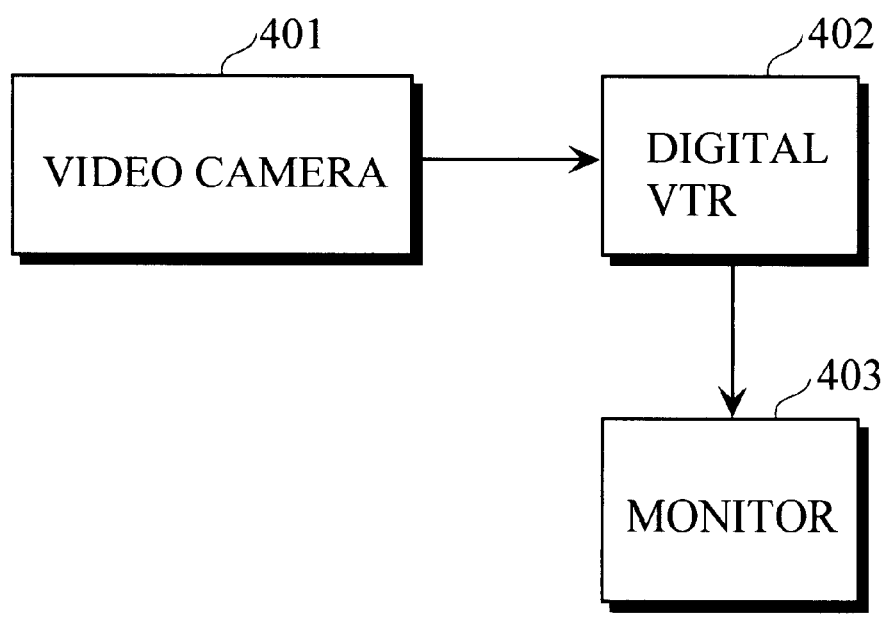
FIG. 16 is a block diagram showing the configuration of a monitoring system.

FIG. 16 illustrates the entire configuration of a monitoring system.

The monitoring system comprises a video camera (hereinafter referred to as a monitoring camera) 401, a digital VTR 402 for compressing a video signal obtained by the monitoring camera 401 and recording the compressed video signal on a video tape, and a monitor 403 for displaying an image reproduced by the digital VTR 402.

[2] Description of Operation at Recording Time of Video Signal Processing Circuit in Digital VTR 402

Figure 17:
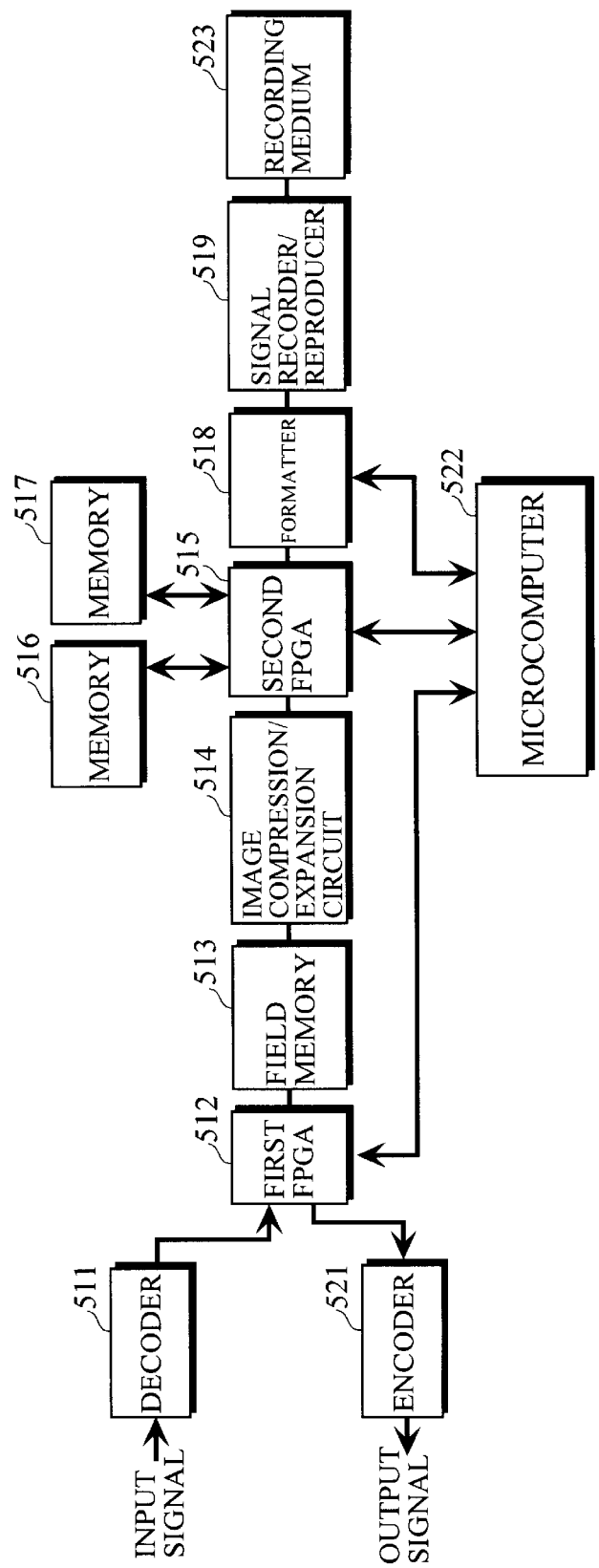
FIG. 17 is a block diagram showing the schematic configuration of a digital VTR.

FIG. 17 illustrates the configuration of a video signal processing circuit in the digital VTR 402. Description is made of operations at the time of recording of the video signal processing circuit.

At the time of recording, an analog video signal fed from the monitoring camera 401 is converted into digital video data by a decoder 511. The video data obtained by the decoder 511 is fed to a first FPGA (Field Programmable Array) 512.

The first FPGA 512 stores the inputted video data in a field memory 513 in a predetermined period of fields (hereinafter referred to as an image acceptance period). The video data stored in the field memory 513 is fed to an image compression/expansion circuit 514, and is compressed according to a JPEG standard, for example, for each field by the image compression/expansion circuit 514. The compressed video data (coded data) obtained by the image compression/expansion circuit 514 is fed to a second FPGA 515.

The second FPGA 515 adds additional information such as recording time information (information relating to the current year, month, day, minute, and second), alarm information and a camera number to the coded data fed from the image compression/expansion circuit 514. The alarm information is information generated when it is detected that an important phenomenon occurs on security. For example, the monitoring camera 401 generates the alarm information when a motion vector of an input image is not less than a predetermined value, and transmits the generated alarm information to a microcomputer 522. Further, when an object sensing signal is inputted to the microcomputer 522 from an object sensor provided outside, the microcomputer 522 generates the alarm information. The camera number is information for identifying, in such a system that images from a plurality of monitoring cameras are inputted to the digital VTR 402 by being subjected to time sharing, each of the monitoring cameras.

The second FPGA 515 alternately writes the coded data having the additional information added thereto into two memories 516 and 517 for each predetermined block including data corresponding to a plurality of fields, reads out, every time the data corresponding to one block are written into the memory, the data from the memory to which the data corresponding to one block have been written, and feeds the data to a formatter 518. One block is composed of data corresponding to 288 tracks, including information relating to audio in this example.

Specifically, the second FPGA 515 writes the coded data having the additional information added thereto into one of the memories, for example, the first memory 516. When the writing of the data corresponding to one block into the first memory 516 is terminated, the memory into which the data are to be written is switched to the other second memory 517 and at the same time, the reading of the data from the first memory 516 is started.

The data read out of the first memory 516 are fed to the formatter 518. When the reading of the data corresponding to one block from the first memory 516 is completed, the reading is stopped.

Thereafter, when the writing of the data corresponding to one block into the second memory 517 is terminated, the memory into which the data are to be written is switched to the first memory 516 and at the same time, the reading of the data from the second memory 517 is started. The data read out of the second memory 517 are fed to the formatter 518. When the reading of the data corresponding to one block from the second memory 517 is completed, the reading is stopped. Thereafter, the same processing is repeated.

In the formatter 518, the fed data is converted into data having a data structure which can be recorded on the video tape. The data obtained by the formatter 518 is recorded on a video tape (a recording medium) 523 through a recording amplifier and a video head in a signal recorder/reproducer 519. That is, video data are basically recorded for each block (corresponding to 288 tracks) on the video tape 523. Every time the recording of the data for each block is terminated, the video tape is stopped.

The second FPGA 515 and the formatter 518 are controlled by the microcomputer 522.

Figure 18:
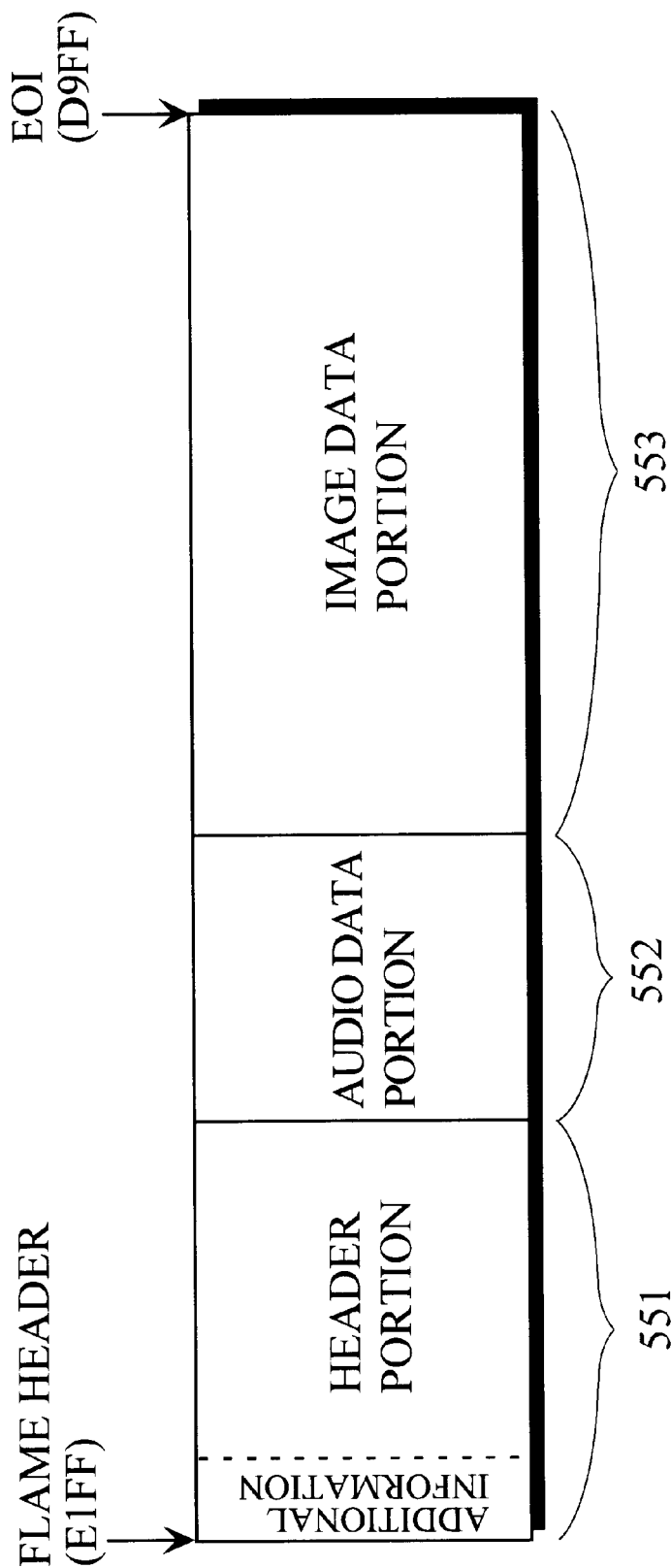
FIG. 18 is a schematic view showing a format for data corresponding to one field recorded on a video tape.

FIG. 18 illustrates a format for data corresponding to one field to be recorded on the video tape.

A data block corresponding to one field comprises a header portion 551, an audio data portion 552, and a video data portion 553.

The header portion 551 includes additional information such as recording time information, alarm information, and a camera number, a quantization table (Q table), voice added data, and so forth. A frame header (for example, "E1FFh") indicating the head of the header portion 551 is inserted into the head of the header portion 551. An end code (EOI; for example, "D9FFh") indicating the end of the video data portion 553 is inserted into the end of the video data portion 553.

[3] Description of Operation at Normal Play Time of Video Signal Processing Circuit At the time of normal play, video data are read out for each block from the video tape by the video head in the signal recorder/reproducer 519. The read video data are fed to the second FPGA 515 through the reproduction amplifier in the signal recorder/reproducer 519 and the formatter 518.

The second FPGA 515 alternately writes the fed data (coded data and added data) into the two memories 516 and 517 for each block, reads out, every time the data corresponding to one block are written into the memory, the data from the memory to which the data corresponding to the one block have been written, and feeds the read data to the image compression/expansion circuit 514.

Figure 19:
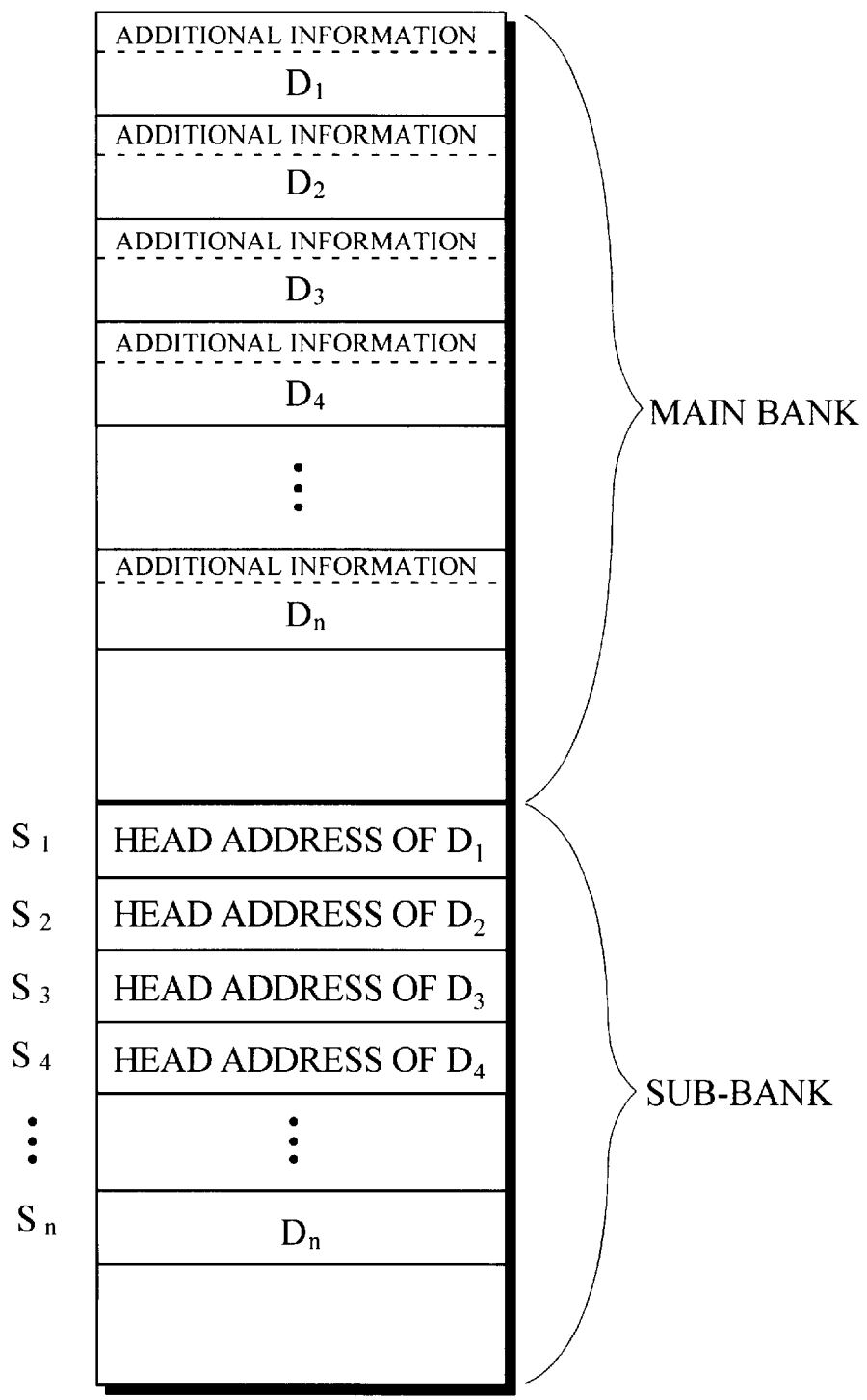
FIG. 19 is a schematic view showing data stored in each of memories 516 and 517 at the time of reproduction.

FIG. 19 illustrates data stored in each of the memories 516 and 517 by the second FPGA 515. The second FPGA 515 writes the data fed from the formatter 518 into a main bank in each of the memories 516 and 517 for each field, and stores a head address storing a frame header at the head of each of field data $D_1, D_2, \ldots, D_n$ in a sub-bank in the memory such that an address into which each of the field data $D_1, D_2, \ldots, D_n$ written into the main bank is to be written can be recognized.

As shown in FIG. 19, when it is assumed that the field data $D_1, D_2, \ldots, D_n$ are written in this order into each of the memories 516 and 517, the field data $D_1, D_2, \ldots, D_n$ are reproduced in this order at the time of normal play.

At the time of normal play, the microcomputer 522 successively designates addresses $S_1, S_2, \ldots, S_n$ in the sub-bank in this order, so that the field data $D_1, D_2, \ldots, D_n$ are read out in this order. Coded video data in the read field data is fed to the image compression/expansion circuit 514.

Description is made of operations in a case where the microcomputer 522 designates the address $S_1$ in the sub-bank. When the microcomputer 522 designates the address $S_1$ in the sub-bank for the second FPGA 515, the second FPGA 515 acquires the head address stored in the designated address $S_1$, and reads out the field data $D_1$ from the acquired head address. In this case, additional information such as recording time information is separated from the field data $D_1$. The separated additional information is fed to the microcomputer 522. Further, audio data is separated from the field data $D_1$. The separated audio data is fed to an audio signal processing circuit (not shown). Coded video data in the field data $D_1$ is fed to the image compression/expansion circuit 514.

In the image compression/expansion circuit 514, the fed coded video data is expanded. Video data obtained by the image compression/expansion circuit 514 is stored in the field memory 513. When video data corresponding to one field is stored in the field memory 513, the video data corresponding to one field is repeatedly read out by the first FPGA 512, and is fed to the encoder 521. In the encoder 521 the fed video data is returned to an analog video signal, and the analog video signal is then fed to the monitor 403.

[4] Description of Special Play

[4-1] Description of Operation At Reverse Play Time

At the time of reverse play, data are read for each block from the video tape in the order reverse to the order in which the blocks are recorded, as at the time of normal play. In one of the blocks, the data are read in the order recorded. The data read from the video tape are alternately stored in the memories 516 and 517.

When it is assumed that the field data $D_1, D_2, \ldots, D_n$ are written in this order into each of the memories 516 and 517, as shown in FIG. 19, the field data $D_n, D_{(n-1)}, \ldots, D_2, D_1$ are reproduced in this order at the time of reverse play.

Specifically, at the time of reverse play, the microcomputer 522 successively designates addresses $S_n, S_{(n-1)}, \ldots, S_2, S_1$ in the sub-bank in this order, so that the field data $D_n, D_{(n-1)}, \ldots, D_2, D_1$ are read out in this order. Coded video data in the read field data is fed to the image compression/expansion circuit 514.

[4-2] Description of Operation at Fast-Forward Play Time

At the time of fast-forward play, data read from the video tape are alternately stored for each block in the memories 516 and 517, as at the time of normal play. At the time of fast-forward play, however, field data stored in each of the memories 516 and 517 are read out every a predetermined number of fields.

At the time of fast-forward play, the microcomputer 522 successively designates addresses $S_1, S_{1+k}, S_{1+2k}, \ldots$ in the sub-bank in this order, letting k be an integer of not less than two, for example, so that field data $D_1, D_{1+k}, D_{1+2k}, \ldots$ are read out in this order. Coded video data in the read field data is fed to the image compression/expansion circuit 514.

[4-3] Description of Operation at Fast-Backward Play Time

At the time of fast-backward play, data read from the video tape are alternately stored for each block in the memories 516 and 517, as at the time of reverse play. At the time of fast-backward play, however, field data stored in each of the memories 516 and 517 are read out every a predetermined number of fields.

At the time of fast-backward play, the microcomputer 522 successively designates addresses $S_n, S_{n-k}, S_{n-2k}, \ldots$ in the sub-bank in this order, letting k be an integer of not less than two, for example, so that field data $D_n, D_{n-k}, D_{n-2k}, \ldots$ are read out in this order. Coded video data in the read field data is fed to the image compression/expansion circuit 514.

[5] Description of Search Processing

[5-1] Description of Case Where Only Video Data Having Alarm Information Added thereto is Retrieved and Reproduced Description is made of a case where only video data having alarm information added thereto is retrieved and reproduced.

Also in this case, video data are read out for each block from the video tape 523 by the video head in the signal recorder/reproducer 519, as at the time of normal play. The read video data are fed to the second FPGA 515 through the reproduction amplifier in the signal recorder/reproducer 519 and the formatter 518.

The second FPGA 515 alternately writes the fed data (coded data and added data) into the two memories 516 and 517 for each block. The second FPGA 515 writes the data fed from the formatter 518 into the main bank in each of the memories 516 and 517 for each field, and stores a head address storing a frame header at the head of each of the field data $D_1, D_2, \ldots, D_n$ in the sub-bank in the memory, as shown in FIG. 19.

The microcomputer 522 successively designates the addresses $S_1, S_2, \ldots, S_n$ in the sub-bank in this order for the second FPGA 515. However, the second FPGA 515 reads out only the additional information in the field data on the basis of the head address obtained from the sub-bank, and judges whether or not alarm information is included in the additional information. When the alarm information is included in the additional information, the field data is read out. When the alarm information is not included in the additional information, the head address storing the frame header of the subsequent field data is acquired, to read out only the additional information. The second FPGA 515 repeatedly performs such processing.

In a system in which images picked up by a plurality of monitoring cameras are inputted to the digital VTR 400 upon being subjected to time sharing, even when the image picked up by the particular monitoring camera is reproduced and outputted, the search can be performed by the same search method as described above. In this case, however, only when a camera number included in the additional information coincides with a camera number which is a designated retrieval object, the field data having the additional information added thereto is read out.

[5-2] Description of Search Processing by Designating Recording Time

Description is now made of such search processing as to designate recording time to reproduce an image recorded at designated recording time.

At the time of data recording, for each recording block, recording time (year, month, day, minute, second) at the head of the recording block is written as VASS data into the control track of the video tape.

Figure 20:
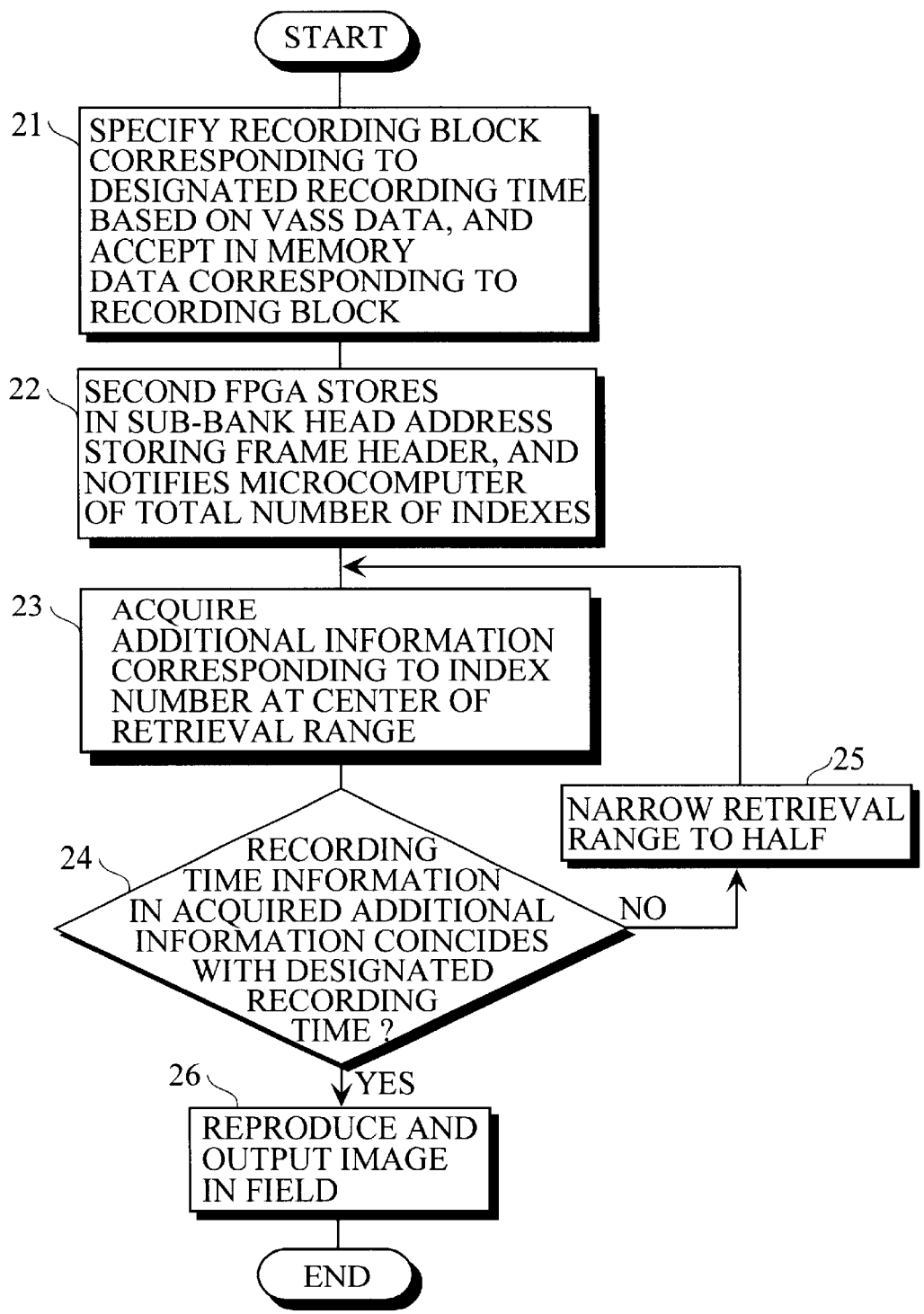
FIG. 20 is a flow chart showing the procedure for search processing by designating recording time.

FIG. 20 shows the procedure for search processing by designating recording time.

A recording block corresponding to designated recording time is first specified on the basis of VASS data written into the control track, and data corresponding to the recording block are accepted in the memory 516 (step 21).

Specifically, the microcomputer 522 accepts the VASS data from the control track while fast forwarding the video tape. When the recording time represented by the VASS data is after the designated recording time, the video tape is rewound by one block. Thereafter, a normal reproduction operation is performed, to accept in the memory 516 data corresponding to a recording block preceding the recording block corresponding to the VASS data representing the recording time after the designated recording time.

The second FPGA 515 stores in the sub-bank the head address storing the frame header at the head of each of the field data when the data corresponding to the specified recording block are accepted in the memory 516. Subscripts 1 to n of addresses $S_1$ to $S_n$ in the sub-bank storing the head addresses shall be referred to as index numbers. The second FPGA 515 notifies the microcomputer 522 of the total number of indexes (the total number of head addresses stored in the sub-bank) (step 22). The microcomputer 522 and the second FPGA 515 start a binary search.

Specifically, the microcomputer 522 first designates the index number at the center of a search range to request additional information for the second FPGA 515, to acquire only the additional information in the field data corresponding to the index number at the center of the search range (step 23). Immediately after the binary search is started, the search range is all fields (all indexes) in the recording block specified at the step 21.

It is judged whether or not recording time information, corresponding to the field, included in the acquired additional information coincides with the designated recording time (step 24). When they do not coincide with each other, it is judged whether the field to be an object precedes or succeeds the field corresponding to the acquired additional information, and the search range is narrowed to half by the results of the judgment (step 25). Therefore, the program is returned to the step 23, to perform the processing at the step 23 and the subsequent steps.

The binary search at the steps 23 to 25 is repeatedly performed, to search a field in which additional information includes the same time as the designated recording time. When the field in which the additional information includes the same time as the designated recording time can be searched (YES at step 24), the microcomputer 522 instructs the second FPGA 515 to output coded video data in the field (step 26). Consequently, data corresponding to the field is reproduced and outputted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital VTR for storing actual data in a memory and recording, every time for each recording block comprising a front dummy data portion, an actual data portion and a rear dummy data portion, actual data corresponding to the capacity of the actual data portion in the recording block are stored in the memory, data for the recording block, that is, front dummy data, the actual data stored in the memory, and rear dummy data in this order on a magnetic tape at the time of recording, while intermittently reading out the data recorded on the magnetic tape for the recording block, storing in the memory the actual data read out of the magnetic tape, reading out the actual data stored in the memory, and reproducing and outputting the read actual data at the time of reproduction, comprising:

means for recording a cue mark in a position, corresponding to a predetermined position in the middle of each recording block, on a control track of the magnetic tape at the time of recording;

means for stopping the acceptance of the data in the memory and accelerating a capstan motor at the time point where the actual data in the recording block are stored in predetermined amounts in the memory at the time of fast-forward play; and means for decelerating the capstan motor when the cue mark is detected.

2. The digital VTR according to claim 1, further comprising means for recording on the control track of the magnetic tape a start mark indicating a predetermined position in the front dummy data portion in each recording block at the time of recording, and means for controlling the timing of reading of the actual data for the recording block utilizing the start mark at the time of fast-forward play.

3. A digital VTR for storing actual data in a memory and recording, every time for each recording block comprising a front dummy data portion, an actual data portion and a rear dummy data portion, actual data corresponding to the capacity of the actual data portion in the recording block are stored in the memory, data for the recording block, that is, front dummy data, the actual data stored in the memory, and rear dummy data in this order on a magnetic tape at the time of recording, while intermittently reading out the data recorded on the magnetic tape for the recording block, storing in the memory the actual data read out of the magnetic tape, reading out the actual data stored in the memory, and reproducing and outputting the read actual data at the time of reproduction, comprising:

a circuit for recording a cue mark in a position, corresponding to a predetermined position in the middle of each recording block, on a control track of the magnetic tape at the time of recording;

a circuit for stopping the acceptance of the data in the memory and accelerating a capstan motor at the time point where the actual data in the recording block are stored in predetermined amounts in the memory at the time of fast-forward play; and a circuit for decelerating the capstan motor when the cue mark is detected.

4. The digital VTR according to claim 3, further comprising a circuit for recording on the control track of the magnetic tape a start mark indicating a predetermined position in the front dummy data portion in each recording block at the time of the recording, and a circuit for controlling the timing of reading of the actual data for the recording block utilizing the start mark at the time of fast-forward play.

* * * * *